United States Patent
Shimada et al.

(10) Patent No.: US 12,130,752 B2
(45) Date of Patent: Oct. 29, 2024

(54) STORAGE SYSTEM

(71) Applicant: Hitachi, Ltd., Tokyo (JP)

(72) Inventors: Kentaro Shimada, Tokyo (JP); Masanori Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/120,827

(22) Filed: Mar. 13, 2023

(65) Prior Publication Data

US 2024/0134806 A1 Apr. 25, 2024
US 2024/0232099 A9 Jul. 11, 2024

(30) Foreign Application Priority Data

Oct. 19, 2022 (JP) .................... 2022-167956

(51) Int. Cl.
*G06F 12/1081* (2016.01)
*G06F 13/24* (2006.01)

(52) U.S. Cl.
CPC .......... *G06F 12/1081* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 7,809,981 B2 * | 10/2010 | Takada | G06F 11/0724 714/5.11 |
| 8,423,677 B2 | 4/2013 | Nakamura et al. | |
| 8,700,856 B2 | 4/2014 | Tanaka et al. | |
| 2006/0005074 A1 * | 1/2006 | Yanai | G06F 11/2066 714/6.32 |
| 2017/0228298 A1 * | 8/2017 | CaraDonna | G06F 11/2056 |

* cited by examiner

*Primary Examiner* — Michael Alsip
(74) *Attorney, Agent, or Firm* — PROCOPIO, CORY, HARGREAVES & SAVITCH LLP

(57) ABSTRACT

A protocol chip transmits the request from the host apparatus to a first processor through a first address translation unit. A first processor transmits a response to the request from the host apparatus, to the protocol chip through the first address translation unit. When the first processor stops processing, an instruction to transmit the request from the host apparatus to a second processor is transmitted to the protocol chip. When receiving the instruction to transmit the request from the host apparatus to the second processor, the protocol chip transmits the request from the host apparatus to the second processor through a second address translation unit. The second processor transmits the response to the request from the host apparatus to the protocol chip through the second address translation unit.

10 Claims, 10 Drawing Sheets

STORAGE SYSTEM

CLAIM OF PRIORITY

The present application claims priority from Japanese patent application JP 2022-167956 filed on Oct. 19, 2022, the content of which is hereby incorporated by reference into this application.

BACKGROUND OF THE INVENTION

1. Field of the Invention

The present invention relates to a storage system including protocol chips and processors.

2. Description of Related Art

In a storage system, a plurality of storage controllers are provided to control the system in order to improve reliability, so that even when a failure occurs in one of the storage controllers and operation is stopped, the remaining storage controller can continuously operate. The typical number of such storage controllers is two.

For example, U.S. Pat. No. 8,700,856B discloses an example where a controller unit of a storage system is configured with two controllers. In this case, each controller is provided with a processor for performing control of the system, and a switch connected to each processor is provided with an NTB (Non-Transparent Bridge).

One of the roles played by the NTB is an address translation function between addresses used by processors connected to each switch and other addresses. In particular, when two controllers are connected, the addresses used by each processor are controlled and managed by each processor, so that the address used by the processor of the one controller is required to be translated into the address used by the processor of the other controller. For example, since each processor assigns arbitrary addresses to the connected memory, the protocol chip, and the like, the same addresses cannot be used as they are when connecting these components.

In addition, when each processor stops, since the processor to control is unavailable, for example, it is unclear which address is assigned to which memory, and thus, the address used by the stopped processor becomes invalid.

In addition, in some cases, in the storage system, stopping of the processor of the controller due to update of an OS (Operating System) or the like in addition to a failure may be required. In the storage system, IO communication for input/output of data to/from a host apparatus is performed. The protocol used for the IO communication with the host apparatus is, for example, Fibre Channel.

The controller of the storage system is provided with a processor and a protocol chip that performs control of the protocol used for such IO communication. Under such circumstances, when the processor of the controller stops, the processor connected to the corresponding protocol chip becomes unavailable and no response is returned for any IO requests from the host apparatus. From the point of view of the host apparatus, the storage system appears to be temporarily system-down. To recover the system, the host apparatus is required to be reconnected to the remaining controller that continues to be running.

In order to solve this problem, it is considered that the storage controller automatically reconnects the IO request from the host apparatus to a controller having a processor that does not stop due to a failure, OS update, or the like.

For example, in the configuration described in U.S. Pat. No. 8,700,856B, since two processors for performing control of the system are installed, when the processor of one controller stops, it is considered that the IO request from the host apparatus is transferred to the processor of the other controller. However, in the technique described in U.S. Pat. No. 8,700,856B, at most only one NTB is installed in each controller, and each protocol chip uses the address controlled by the processor of each controller and does not use the address controlled by the other processor. For this reason, when the processor of the corresponding controller stops, the address cannot be used, so there is no valid address, and each protocol chip cannot transmit the request from the host apparatus to the other processor.

In addition, U.S. Pat. No. 8,423,677B discloses an example of a storage system provided with a local router that has a function that can automatically switch IO communication even when a processor of a controller stops, by automatically distributing an access from a protocol chip to each controller.

However, since such a local router requires complicated control, there may be a case where some processors are installed and program control is performed. In that case, stopping and restarting the local router are required when updating the OS of the local router itself. In addition, in some cases, the local router itself may fail. In such a case, the function of automatically switching the IO communication with the host apparatus by the local router cannot be used, and the IO communication with the host apparatus is stopped.

Therefore, there is a demand for a technology that can continue to respond to an IO request from a host apparatus without having a special control function unit such as a local router when a processor of a storage controller stops.

SUMMARY OF THE INVENTION

According to one aspect of the invention, there is provided a storage system processing a request from a host apparatus, including: a protocol chip controlling a protocol for communication with the host apparatus; a plurality of processors performing control of the storage system; a first address translation unit translating a first address used by a first processor among the plurality of processors and a second address used by the protocol chip; and a second address translation unit translating a third address used by a second processor among the plurality of processors and the second address used by the protocol chip, in which the protocol chip transmits the request from the host apparatus to the first processor through the first address translation unit, in which the first processor transmits a response to the request from the host apparatus transmitted from the protocol chip, to the protocol chip through the first address translation unit, in which when the first processor stops processing, an instruction to transmit the request from the host apparatus to the second processor is transmitted to the protocol chip, in which when receiving the instruction to transmit the request from the host apparatus to the second processor, the protocol chip transmits the request from the host apparatus to the second processor through the second address translation unit, and in which the second processor transmits the response to the request from the host apparatus transmitted to the second processor, to the protocol chip through the second address translation unit.

According to one aspect of the invention, there is provided a storage system processing a request from a host apparatus, including a plurality of storage controllers, in which a first storage controller among the plurality of storage controllers includes: a first protocol chip controlling a protocol for communication with the host apparatus; a first processor performing control of the storage system; and a first address translation unit translating a first address used by the first processor and a second address used by the first protocol chip, in which a second storage controller among the plurality of storage controllers includes: a second protocol chip controlling a protocol for communication with the host apparatus; a second processor performing control of the storage system; and a second address translation unit translating a third address used by the second processor and a fourth address used by the second protocol chip, in which at least one of the first storage controller and the second storage controller includes a third address translation unit translating the second address used by the first protocol chip and the fourth address used by the second protocol chip, in which the first protocol chip transmits the request from the host apparatus to the first processor through the first address translation unit, in which the first processor transmits a response to the request from the host apparatus transmitted from the first protocol chip, to the first protocol chip through the first address translation unit, in which, when the first processor stops operating, an instruction to transmit the request from the host apparatus to the second processor is transmitted to the first protocol chip, in which, when receiving the instruction to transmit the request from the host apparatus to the second processor, the first protocol chip transmits the request from the host apparatus to the second processor through the third address translation unit and the second address translation unit, and in which the second processor transmits the response to the request from the host apparatus transmitted from the first protocol chip to the second processor, to the first protocol chip through the second address translation unit and the third address translation unit.

According to one aspect of the invention, even when a first processor stops operating, a second processor can take over an IO request from a host apparatus and continue to respond to the IO request from the host apparatus.

DESCRIPTION OF EMBODIMENTS

First Embodiment

Figure 1:
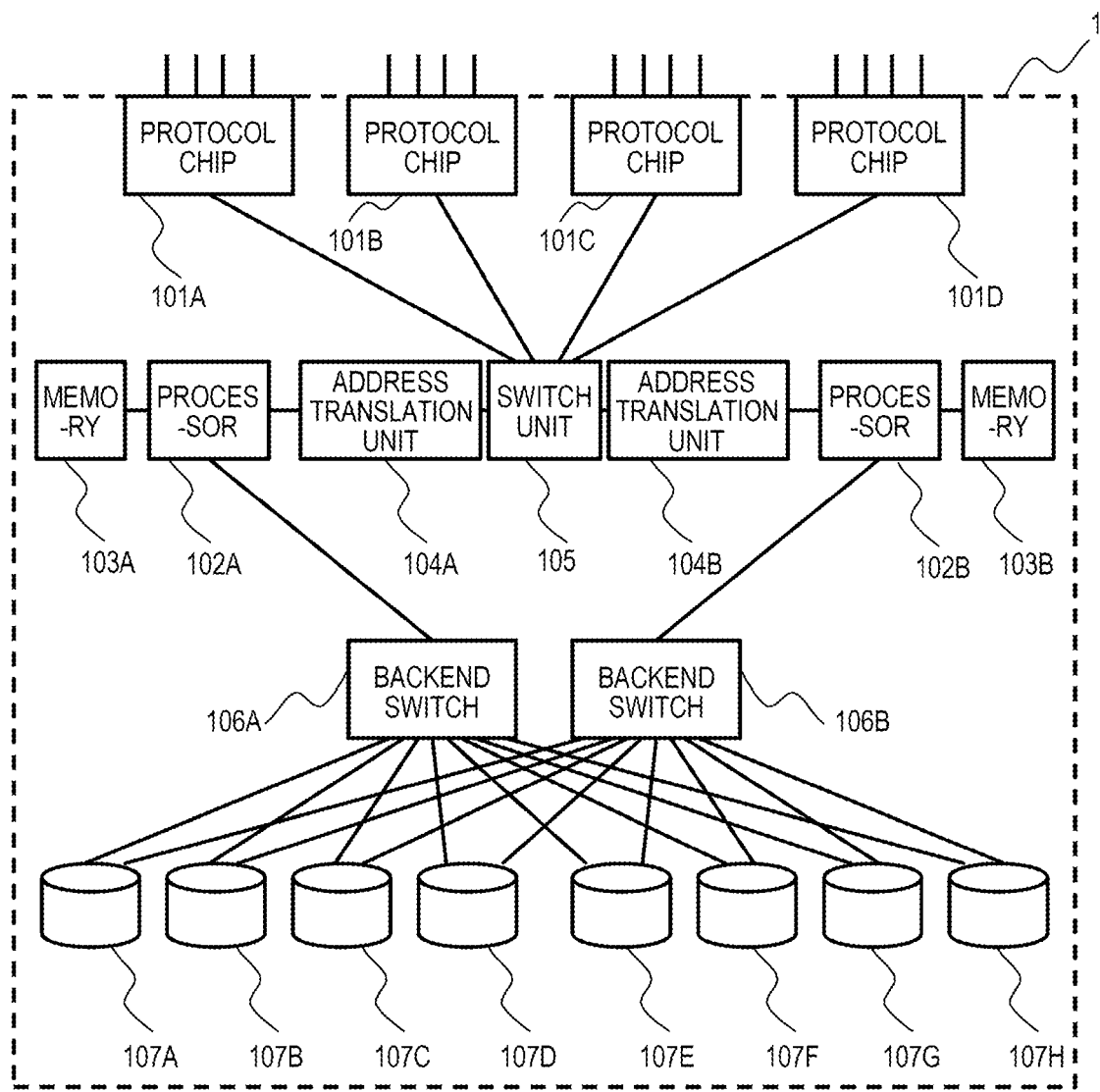
FIG. 1 is a first example of a configuration of a storage system.

A first embodiment will be described with reference to FIGS. 1 and 2. FIG. 1 is an example of a configuration of a storage system according to the first embodiment. In FIG. 1, a storage system 1 according to the first embodiment includes four protocol chips 101A to 101D, two processors 102A and 102B, memories 103A and 103B, two address translation units 104A and 104B, switch unit 105, two backend switches 106A and 106B, and eight storage devices 107A to 107H.

Each of the protocol chips 101A to 101D is connected to a host apparatus (not illustrated), performs protocol control of IO communication with the host apparatus, takes out an IO request from the host apparatus, or returns a response to the IO request to the host apparatus. Although the four protocol chips 101A to 101D are illustrated in FIG. 1, the number of protocol chips 101A to 101D is not limited to four and may be any number of one or more.

The processors 102A and 102B perform overall control of the storage system 1. Although the two processors 102A and 102B are illustrated in FIG. 1, the number of processors 102A and 102B is not limited to two and may be any number of two or more. Similarly, the memories 103A and 103B store program codes executed by the processors 102A and 102B, respectively, and data to be processed. The memories 103A and 103B are typically volatile memories such as a DRAM (Dynamic Random Access Memory). Although the two memories 103A and 103B are illustrated in FIG. 1, the number of memories 103A and 103B is not limited to two and may be any number of equal to or larger than the number of processors 102A and 102B.

The address translation units 104A and 104B translate addresses used by the processors 102A and 102B and addresses used by the protocol chips 101A to 101D. By translating the addresses between each other, the address translation units 104A and 104B transfer requests from the host apparatus transmitted by the protocol chips 101A to 101D to the processors 102A and 102B and transfer responses returned by the processors 102A and 102B to the protocol chips 101A to 101D.

For example, the protocol chips 101A to 101D assign the address to communication data indicating the request from the host apparatus for being transferred from the protocol chip 101A or 101B to the processor 102A or 102B. The protocol chips 101A to 101D transmit the communication data to the address translation unit 104A or 104B through the switch unit 105. The address translation unit 104A or 104B translates the addresses assigned by the protocol chips 101A to 101D into the addresses used by the processor 102A or 102B, respectively, to transfer the corresponding communication data to the processor 102A or 102B.

Although the two address translation units 104A and 104B are illustrated in FIG. 1, the number of address translation units 104A and 104B is not limited to two and may be any number of equal to or larger than the number of processors 102A and 102B. One or more address translation units are implemented for each of the processors 102A and 102B.

The switch unit 105 performs switching of the connections between the protocol chips 101A to 101D and the address translation units 104A and 104B. The switching system may be a circuit switching system in which at most one of the protocol chips 101A to 101D is connected to either the address translation unit 104A or 104B or may also be a packet switching system in which the communication data between the protocol chips 101A to 101D and the address translation units 104A and 104B is divided into packets and switching is performed for each packet.

Although the one switch unit 105 is illustrated in FIG. 1, the number of switch unit 105 is not limited to one, and may be any number. Depending on the design, the protocol chips 101A to 101D and the address translation units 104A and 104B may be directly connected to each other without providing the switch unit 105. In this case, each of the address translation units 104A and 104B is connected to all the protocol chips 101A to 101D.

In addition, the backend switches 106A and 106B also perform switching of the connections between the processors 102A and 102B and the storage devices 107A to 107H. This switching system may also be a circuit switching system in which at most one of the storage devices 107A to 107H is connected to the processor 102A or 102B or may also be a packet switching system in which the communication data between the storage devices 107A to 107H and the processors 102A and 102B is divided into packets and switching is performed packet by packet.

The switching system of the backend switches 106A and 106B may be determined according to the input/output storage protocol used by the storage devices 107A to 107H. One example of a typical storage protocol used by the storage devices 107A to 107H is NVMe (Non-Volatile Memory express). The NVMe generally uses PCIe (Peripheral Component Interconnect express) to perform communication of commands, responses, and data.

Since the PCIe is a packet communication protocol, when the storage devices 107A to 107H use the NVMe, the backend switches 106A and 106B are considered to use the packet switching system. In addition, another example of the storage protocol used for storage devices 107A to 107H is SAS (Serial Attached Small computer system interface).

Since the SAS is a protocol of the circuit switching system, when the storage devices 107A to 107H use the SAS, the backend switches 106A and 106B use the circuit switching system. In addition, when the storage devices 107A to 107H use the SAS, the SAS protocol chips may be added to the processors 102A and 102B to control the command/response/data communication by the SAS. Otherwise the processors 102A and 102B or the backend switches 106A and 106B may be allowed to have the function of the SAS protocol chips.

It is noted that, although the two backend switches 106A and 106B are illustrated in FIG. 1, the number of backend switches 106A and 106B is not limited to two and may be any number. In one case, the processors 102A and 102B may be directly connected to the storage devices 107A to 107H, respectively, without providing backend switches 106A and 106B.

The storage devices 107A to 107H output or store data in response to data read or write request transmitted from the processors 102A and 102B through the backend switch 106A or 106B. A typical example of the storage devices 107A to 107H is an SSD (Solid State Drive) using a flash memory as a storage element. Another example of the storage devices 107A to 107H is an HDD (Hard Disk Drive) using a magnetic disk as a storage element.

The storage devices 107A to 107H may be one type of storage device or may be a mixture of a plurality of types of storage devices. In addition, the eight storage devices 107A to 107H are illustrated in FIG. 1, but the number of storage devices 107A to 107H is not limited to eight and may be any number.

The storage devices 107A to 107H may not be installed in the storage system 1. In this case, another storage system other than the host apparatus may be connected to one of the protocol chips 101A to 101D. The processor 102A or 102B may transmit the data read or write request to the another storage system through one of the protocol chips 101A to 101D, the address translation unit 104A or 104B, and the switch unit 105 to read or write data.

As described above, by connecting the protocol chips 101A to 101D, the switch unit 105, the address translation units 104A and 104B, and the processors 102A and 102B, the address used by the protocol chips 101A to 101D can be translated into any address used by the processor 102A or 102B.

In this manner, by providing the corresponding address translation units 104A and 104B to the processors 102A and 102B, respectively, the addresses used by the processors 102A and 102B are independent from the addresses used by the protocol chips 101A to 101D. Therefore, even when one of the processors 102A and 102B stops, the request from the host apparatus and the response to the host apparatus can be transferred between the remaining processor 102A or 102B and the protocol chips 101A to 101D. As a result, even when one of the processors 102A and 102B stops, it is possible to continue to respond to the IO requests from the host apparatus.

An example of operation in which the storage system 1 illustrated in FIG. 1 continues to respond to the IO requests from the host apparatus even when one of the processors 102A and 102B stops will be described with reference to FIG. 2.

Figure 2:
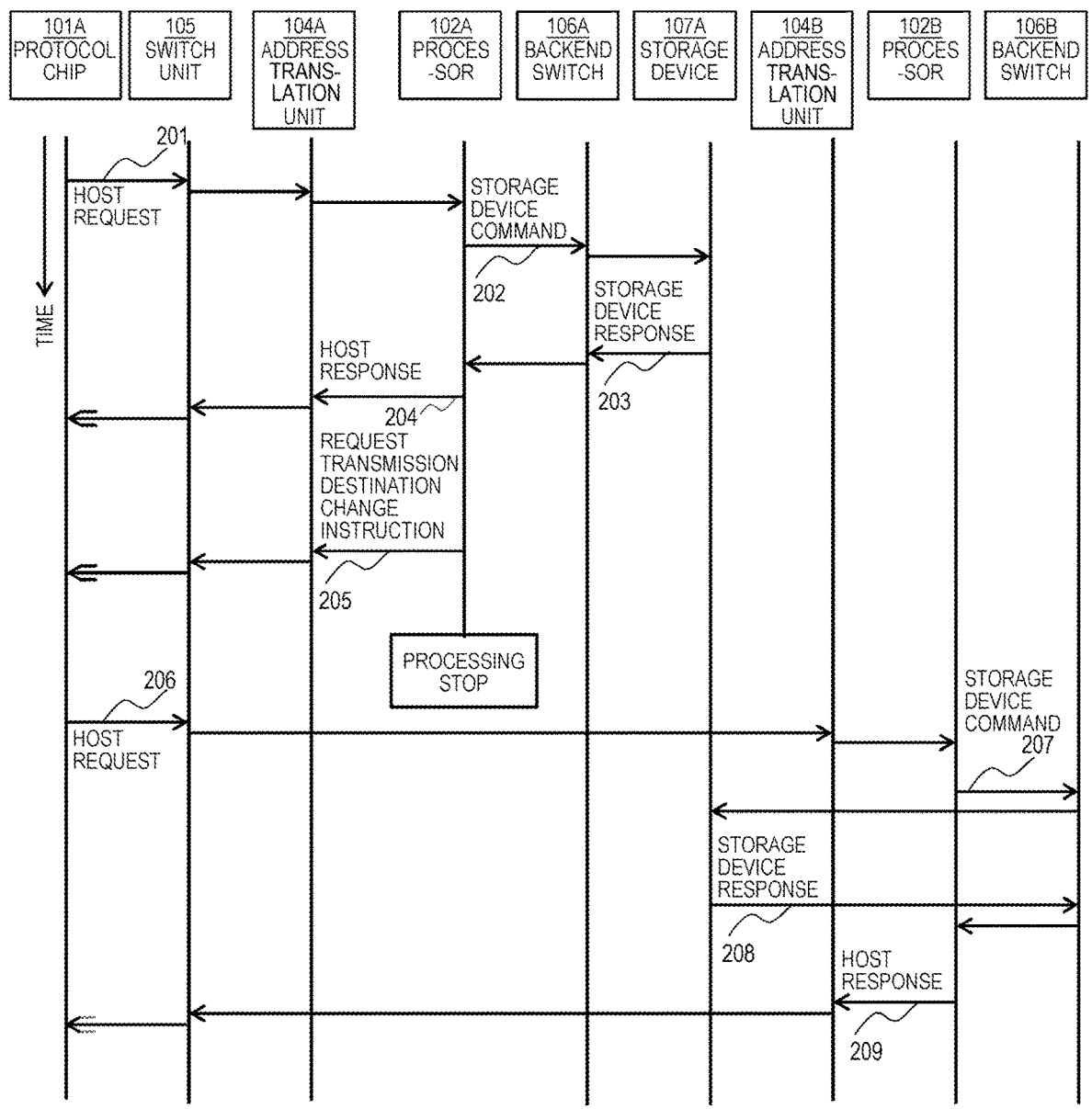
FIG. 2 is a first example of a processing sequence taking over requests and responses from a host apparatus in the first configuration example.

In FIG. 2, when receiving a request (host request) from the host apparatus (not illustrated), the protocol chip 101A transmits the request to the processor 102A through the switch unit 105 and the address translation unit 104A (201). The address translation unit 104A translates the address assigned to the host request for transmitting to the processor 102A by the protocol chip 101A into the address used by the processor 102A.

A typical example of the host request is to write data in the storage system 1. In this case, the data to be written may be transmitted from the host apparatus together with the corresponding host request, or the data write request and the data itself may be transmitted separately from the host apparatus according to a procedure specified for the purpose.

In addition, another example of the host request is to read data stored in the storage system 1. Still another example of the host request is an inquiry about the amount of data stored and the amount of data that can be still stored in the storage system 1. Furthermore, there may be the host request to check whether the storage system 1 is operating normally and whether it is possible to input/output data to/from the host apparatus.

When receiving the host request from the protocol chip 101A through the address translation unit 104A, the processor 102A generates a storage device command for controlling the storage device 107A according to the received host request, and transmits the storage device command to the storage device 107A through the backend switch 106A (202).

One example of the storage device command is to write data. In this case, the data to be written may be transmitted together with the corresponding write device command, or may be transmitted separately from the write device command according to a procedure specified for the purpose. In addition, another example is to read data. In addition, even with respect to the storage device commands, similarly to the host requests from the host apparatus, there may also be the storage device commands for checking the amount of data that can be stored in the storage device 107A and whether the storage device 107A is operating normally.

After receiving the storage device command from the processor 102A, the storage device 107A returns a storage device response to the processor 102A through the backend switch 106A again (203).

In the case where the storage device 107A receives the storage device command to write data in step 202, the storage device response may be a response indicating that the data is stored normally. In the case where the storage device 107A receives the storage device command to read data in step 202, the response indicates that the data is read normally. In this case, the read data may be transmitted together with the corresponding storage device response. Alternatively, the read data may be transmitted separately from the device response according to a procedure specified for the purpose.

When receiving the storage device response from the storage device 107A, the processor 102A generates the host response accordingly and returns the host response to the protocol chip 101A through the address translation unit 104A and the switch unit 105 (204). The address translation unit 104A translates the address assigned to the host response for transmitting to the protocol chip 101A by the processor 102A into the address used by the protocol chip 101A. At this time, when the host request received in step 201 is to read data, the read data may be transmitted together with the corresponding host response. Or, alternatively, the read data may be transmitted separately from the host response according to a procedure specified for the purpose.

When receiving the host response from the processor 102A through the address translation unit 104A, the protocol chip 101A returns the response to the host apparatus (not illustrated). At this time, when the request first received from the host apparatus is to read data stored in the storage system 1, the read data may be returned together with the host response, or may be returned separately form the host response according to a procedure specified for the purpose.

Next, an example where the processor 102A sends a switching of the request transmission destination to the protocol chip 101A when the processor 102A stops in the first embodiment will be described.

Subsequently, in FIG. 2, the processor 102A generates a request transmission destination change instruction and sends the request transmission destination change instruction to the protocol chip 101A through the address translation unit 104A and the switch unit 105 (205). The address translation unit 104A translates the address assigned to the request transmission destination change instruction for transmitting to the protocol chip 101A by the processor 102A into the address used by the protocol chip 101A.

The new request transmission destination may be explicitly indicated in the corresponding change instruction, or may be automatically selected according to a predefined rule by the protocol chip 101A that receives the request transmission destination change instruction. Alternatively, a mechanism for determining the new request transmission destination may be separately provided in the storage system 1.

After that, the processor 102A stops the processing. The reason for stopping the processing is, for example, OS update. In such a case, since it is known in advance that the processor 102A is stopped, the processor 102A can transmit the request transmission destination change instruction to the protocol chip 101A as in step 205 before stopping the processing.

In the example illustrated in FIG. 2, after the protocol chip 101A receives the request transmission destination change instruction, in the case of receiving the request from the host apparatus (not illustrated), the protocol chip 101A transmits the host request to the processor 102B through the switch unit 105 and the address translation unit 104B (206). The address translation unit 104B translates the address assigned to the host request for transmitting to the processor 102B by the protocol chip 101A into the address used by the processor 102B. When receiving the host request, the processor 102B generates the storage device command and transmits the storage device command to the storage device 107A through the backend switch 106B (207).

When receiving the storage device command, the storage device 107A performs a predetermined operation according to the storage device command and returns the result as the storage device response to the processor 102B through the backend switch 106B (208). The processor 102B that receives the storage device response generates the host response according to its content and transmits the host response to the protocol chip 101A through the address translation unit 104B and the switch unit 105 (209). The address translation unit 104B translates the address assigned to the host response for transmitting to the protocol chip 101A by the processor 102B into the address used by the protocol chip 101A.

When receiving the host response, the protocol chip 101A returns the response to the host apparatus (not illustrated). The operations of transmitting the host request and the like from step 206 to step 209 are the same as the operations from step 201 to step 204, except that the working processor is 102B, not 102A, the address translation unit used is 104B, not 104A, and the backend switch used is 106B, not 106A.

By processing as described above, even when the processor 102A stops the operating, the storage system 1 can continue to receive the host requests and return the responses.

When resuming the processing of processor 102A, similarly to the operation of step 205, the processor 102A may change back the request transmission destination to the processor 102A from the processor 102B by transmitting the request transmission destination change instruction for changing a request transmission destination to the processor 102A to the protocol chip 101A. Alternatively, the processor 102B taking over the processing may detect that the processor 102A resumes the processing by some means specified for the purpose, similarly to the operation of step 205, may transmit the request transmission destination change instruction for changing the request transmission destination to the processor 102A, to the protocol chip 101A, and change back the request transmission destination to the processor 102A.

Alternatively, the request from the protocol chip 101A may continue to be processed by the processor 102B, and the processor 102A resuming the processing may process the request from any of other protocol chips 101B to 101D. As a result, even when the processor 102A resumes the processing, the request from the host apparatus can be processed without delay.

Second Embodiment

Next, a second embodiment will be described with reference to FIG. 3. In the second embodiment, an example of a configuration of a storage system is the same as the configuration of the storage system 1 illustrated in FIG. 1 described in the first embodiment. Although the configuration of the storage system 1 illustrated in FIG. 1 is used, the operations are different from those of the first embodiment illustrated in FIG. 2, so the differences will be mainly described below.

Figure 3:
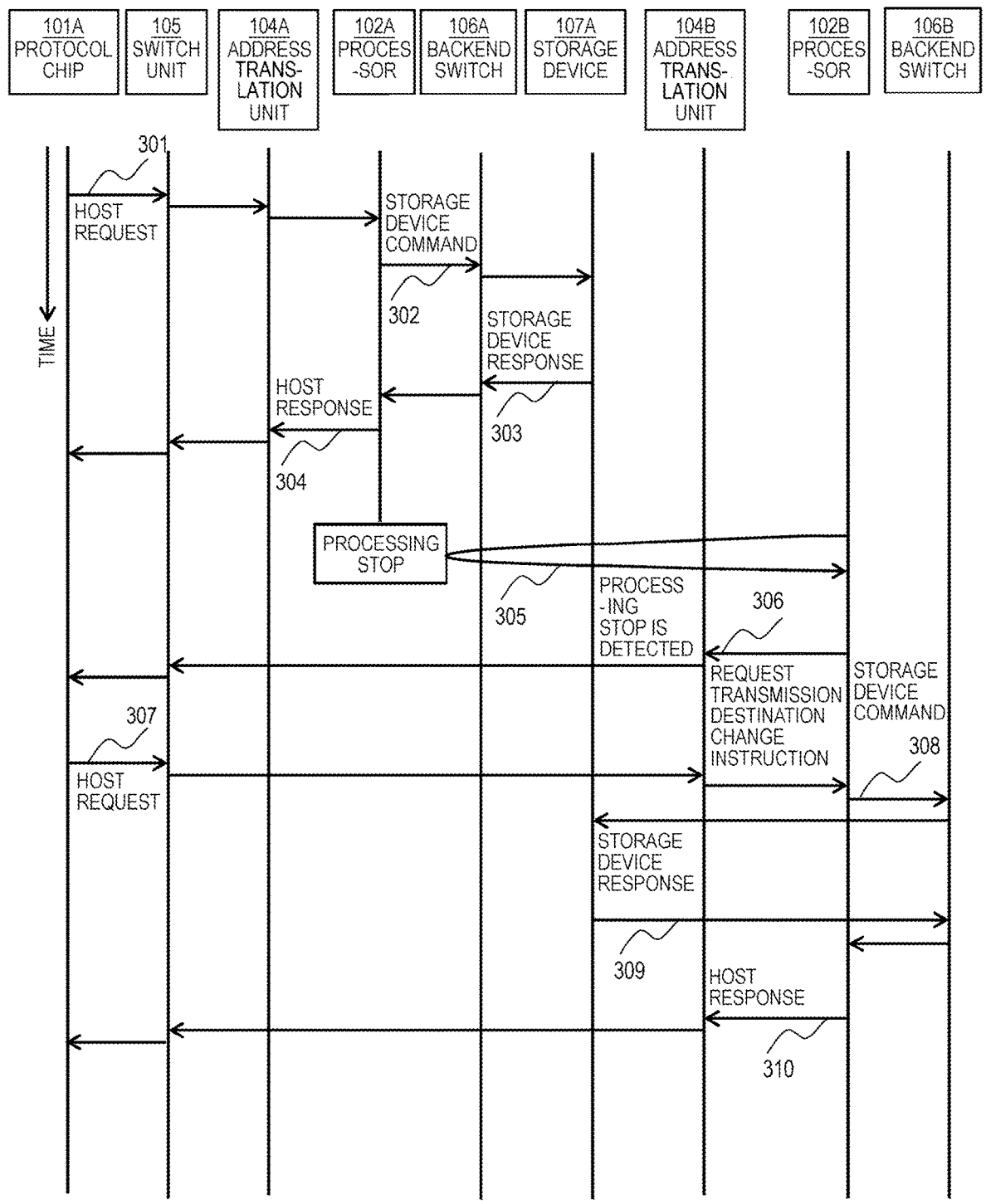
FIG. 3 is a second example of a processing sequence taking over the requests and responses from the host apparatus in the first configuration example.

FIG. 3 is an example of an operation of the storage system 1 according to the second embodiment. In FIG. 3, when receiving the request from the host apparatus (not illustrated), a protocol chip 101A transmits the host request to a processor 102A through a switch unit 105 and an address translation unit 104A (301). The address translation unit 104A translates the address assigned to the host request for transmitting to the processor 102A by the protocol chip 101A into the address used by the processor 102A.

When receiving the host request, the processor 102A generates the storage device command and transmits the storage device command to the storage device 107A through the backend switch 106A (302). When receiving the storage device command, the storage device 107A performs a predetermined operation according to the received storage device command and returns the result as the storage device response to the processor 102A through the backend switch 106A (303).

The processor 102A that receives the storage device response generates the host response according to its content, and transmits the host response to the protocol chip 101A through the address translation unit 104A and the switch unit 105 (304). The address translation unit 104A translates the address assigned to the host response for transmitting to the protocol chip 101A by the processor 102A into the address used by the protocol chip 101A.

When receiving the host response, the protocol chip 101A returns the response to the host apparatus (not illustrated). The operations of transmitting the host request and the like from step 301 to step 304 are the same as the operations from step 201 to step 204 illustrated in FIG. 2.

Next, in FIG. 3, it is assumed that the processor 102A stops the processing. In this case, the processing may be stopped not only due to factors that can be known and planned in advance, such as OS update, but also due to factors that cannot be known in advance, such as a failure. When it is not known to stop the processing in advance, the processor 102A cannot transmit the request transmission destination change instruction to the protocol chip 101A before stopping the processing, as previously described in step 205 of FIG. 2.

In the example of FIG. 3, although the processor 102A itself cannot know in advance that the processor 102A stops the processing, the processor 102B can detect that the processor 102A stops. Therefore, when the processor 102A stops the processing, the processor 102B detects that the processor 102A stops the processing (305).

When detecting that the processor 102A stops the processing, the processor 102B transmits the request transmission destination change instruction to the protocol chip 101A, which transmits the host request to the processor 102A, through the address translation unit 104B and the switch unit 105 (306). The address translation unit 104B translates the address assigned to the request transmission destination change instruction for transmitting to the protocol chip 101A by the processor 102B into the address used by the protocol chip 101A.

After the protocol chip 101A receives the request transmission destination change instruction, in the case of receiving the request from the host apparatus (not illustrated), the protocol chip 101A transmits the host request to the processor 102B through the switch unit 105 and the address translation unit 104B (307). The address translation unit 104B translates the address assigned to the host request for transmitting to the processor 102B by the protocol chip 101A into the address used by the processor 102B.

When receiving the host request, the processor 102B generates the storage device command and transmits the storage device command to the storage device 107A through the backend switch 106B (308). When receiving the storage device command, the storage device 107A performs a predetermined operation according to the received storage device command and returns the result as the storage device response to the processor 102B through the backend switch 106B (309). The processor 102B that receives the storage device response generates the host response according to its content, and transmits the host response to the protocol chip 101A through the address translation unit 104B and the switch unit 105 (310).

The address translation unit 104B translates the address assigned to the host response for transmitting to the protocol chip 101A by the processor 102B into the address used by the protocol chip 101A.

When receiving the host response, the protocol chip 101A returns the response to the host apparatus (not illustrated). The operations of transmitting the host request and the like from step 307 to step 310 are the same as the operations from step 206 to step 209 illustrated in FIG. 2.

By operating as described above, even when it is not known in advance that the processor 102A stops the processing, the processor 102B detects that the processor 102A stops the processing, and takes over and processes the host request. Accordingly, the storage system 1 can continue to receive the host requests and return the responses.

In addition, when the processor 102A resumes the processing, similarly to the operation of step 306, the processor 102A may change back the request transmission destination to the processor 102A from the processor 102B by transmitting the request transmission destination change instruction for changing the request transmission destination to the processor 102A to the protocol chip 101A.

Alternatively, the processor 102B taking over the processing may detect that the processor 102A resumes the processing by some means specified for the purpose, similarly to the operation of step 306, may transmit the request transmission destination change instruction for changing the request transmission destination to the processor 102A, to the protocol chip 101A, and change back the request transmission destination to the processor 102A.

Alternatively, the request from the protocol chip 101A may continue to be processed by the processor 102B, and the processor 102A resuming the processing may process the requests from any of other protocol chips 101B to 101D. As a result, even when the processor 102A resumes the processing, the requests from the host apparatus can be processed without delay.

Third Embodiment

Figure 4:
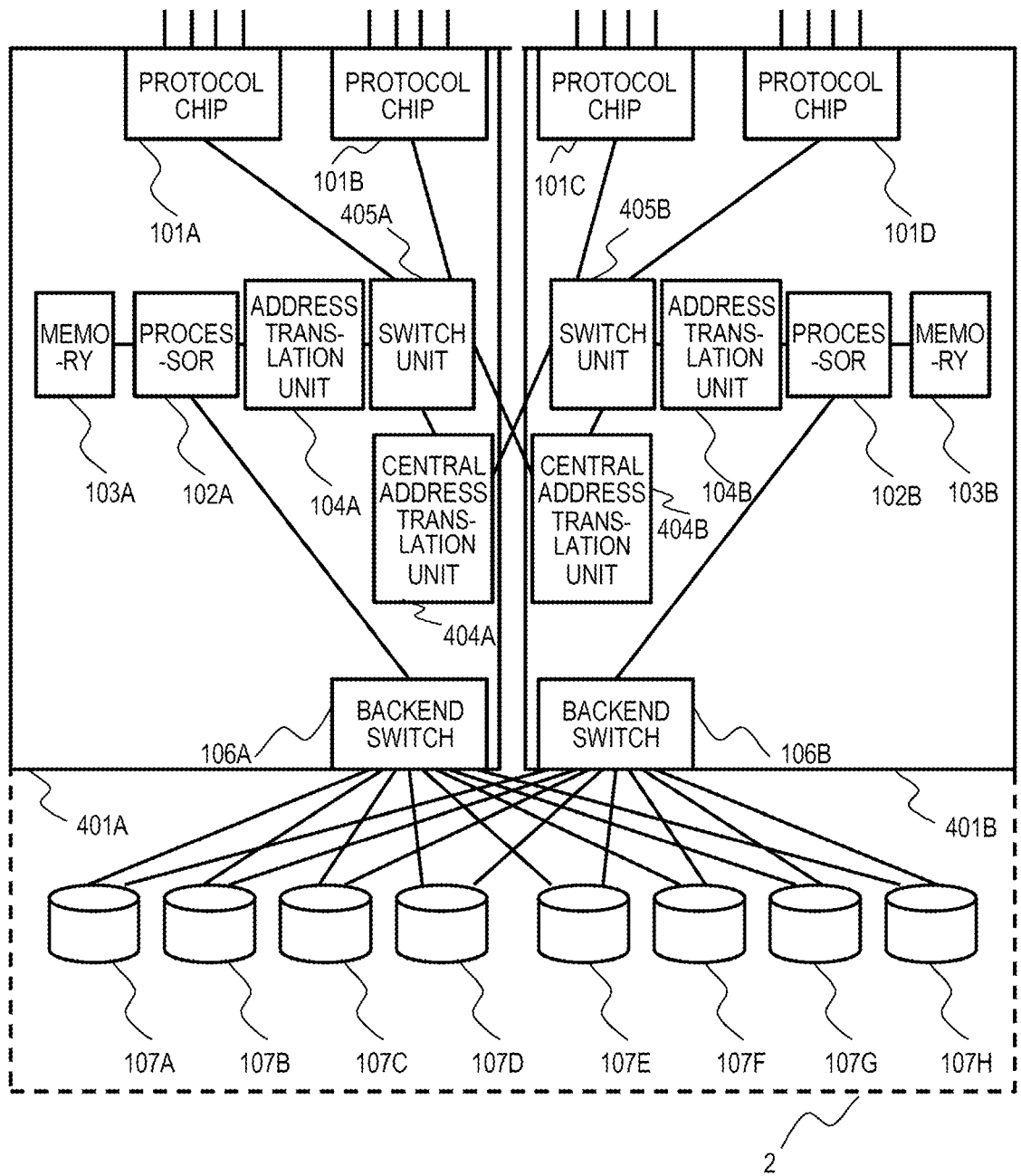
FIG. 4 is a second example of a configuration of the storage system.

A third embodiment will be described with reference to FIGS. 4 and 5. FIG. 4 is an example of a configuration of a storage system according to the third embodiment. In FIG. 4, a storage system 2 according to the third embodiment includes two storage controllers 401A and 401B and eight storage devices 107A to 107H.

The storage controller 401A includes two protocol chips 101A and 101B, one processor 102A, one memory 103A, one address translation unit 104A, one switch unit 405A, one central address translation unit 404A, and one backend switch 106A.

The storage controller 401B includes two protocol chips 101C and 101D, one processor 102B, one memory 103B, one address translation unit 104B, one switch unit 405B, one central address translation unit 404B, and one backend switch 106B.

Although the two storage controllers 401A and 401B are illustrated in FIG. 4, the number of storage controllers is not limited to two and may be any number of two or more. In addition, the numbers of protocol chips, processors, memories, address translation units, switch units, central address translation units, and backend switches included in each of the storage controllers 401A and 401B may be different from those illustrated in FIG. 4.

The storage devices 107A to 107H are the same as the storage devices 107A to 107H of the first embodiment illustrated in FIG. 1. The number of storage devices 107A to 107H is not limited to eight as in the first embodiment illustrated in FIG. 1, and may be any number. Alternatively, similarly to the case of the first embodiment illustrated in FIG. 1, the storage devices 107A to 107H may not be installed in the storage system 2. In this case, another storage system other than the host apparatus may be connected to one of the protocol chips 101A to 101D. The processor 102A or 102B may transmit data read or write request to the another storage system through one of the protocol chips 101A to 101D, the address translation unit 104A or 104B, and the switch unit 405A or 405B to read or write data.

The protocol chips 101A to 101D, the processors 102A and 102B, the memories 103A and 103B, the address translation units 104A and 104B, and the backend switches 106A and 106B included in each of the storage controllers 401A and 401B are the same as the protocol chips 101A to 101D, the processors 102A and 102B, the memories 103A and 103B, the address translation units 104A and 104B, and the backend switches 106A and 106B of the first embodiment illustrated in FIG. 1.

However, the address translation unit 104A translates the addresses used by the protocol chips 101A and 101B into the addresses used by the processor 102A. Similarly, the address translation unit 104B translates the addresses used by the protocol chips 101C and 101D into the addresses used by the processor 102B.

The switch unit 105 of the first embodiment illustrated in FIG. 1 performs switching between the protocol chips 101A to 101D and the address translation units 104A and 104B. In comparison, the switch unit 405A performs switching between the protocol chips 101A and 101B and the address translation unit 104A, and further performs switching between these components and the central address translation units 404A and 404B. In addition, the switch unit 405B performs switching between the protocol chips 101C and 101D and the address translation unit 104B, and further performs switching between these components and the central address translation units 404A and 404B.

Herein, each of the switch units 405A and 405B is connected to both central address translation units 404A and 404B. By doing so, the configurations of the storage controllers 401A and 401B can be allowed to be symmetrical (the same), and the control methods of the storage controllers 401A and 401B can be allowed to be the same.

Therefore, the storage controllers 401A and 401B can be configured in exactly the same manner, and compared to the configuration illustrated in FIG. 1, in the configuration illustrated in FIG. 4, when configuring the storage system 2, since the storage controllers 401A and 401B can be configured in a repeating structure, the scale of the storage system 2 is expandable, and the configuration for easy exchange in units of the storage controller 401A or 401B can be provided. In addition, similarly to the switch unit 105 of the first embodiment illustrated in FIG. 1, the switching system of the switch units 405A and 405B may be a circuit switching system or a packet switching system.

The central address translation units 404A and 404B connect the switch unit 405A or 405B of the same storage controller 401A or 401B as themselves to the switch unit 405B or 405A of the other storage controller, and translate between the addresses used by the protocol chips 101A and 101B and the addresses used by the protocol chips 101C and 101D.

By doing so, when the processor 102A stops the processing, the address translation unit 104B translates the addresses used by the processor 102B into the addresses used by the protocol chips 101C and 101D, and the central address translation unit 404A or 404B can further translate the addresses used by the protocol chips 101C and 101D into the addresses used by the protocol chips 101A and 101B. Accordingly, the requests from the host apparatus received by the protocol chip 101A or 101B can continue to be processed by the processor 102B, and the responses can be returned.

When the processor 102B stops the processing, the address translation unit 104A translates the addresses used by the processor 102A into the addresses used by the protocol chips 101A and 101B, and the central address translation unit 404A or 404B can further translate the addresses used by the protocol chips 101A and 101B into the addresses used by the protocol chips 101C and 101D. Accordingly, the requests from the host apparatus received by the protocol chip 101C or 101D can continue to be processed by the processor 102A, and the responses can be returned. It is noted that one of the central address translation units 404A or 404B may be omitted.

An example of operation in which the storage system 2 illustrated in FIG. 4 continues to respond to the IO requests from the host apparatus even when one of the processors 102A and 102B stops will be described with reference to FIG. 5.

Figure 5:
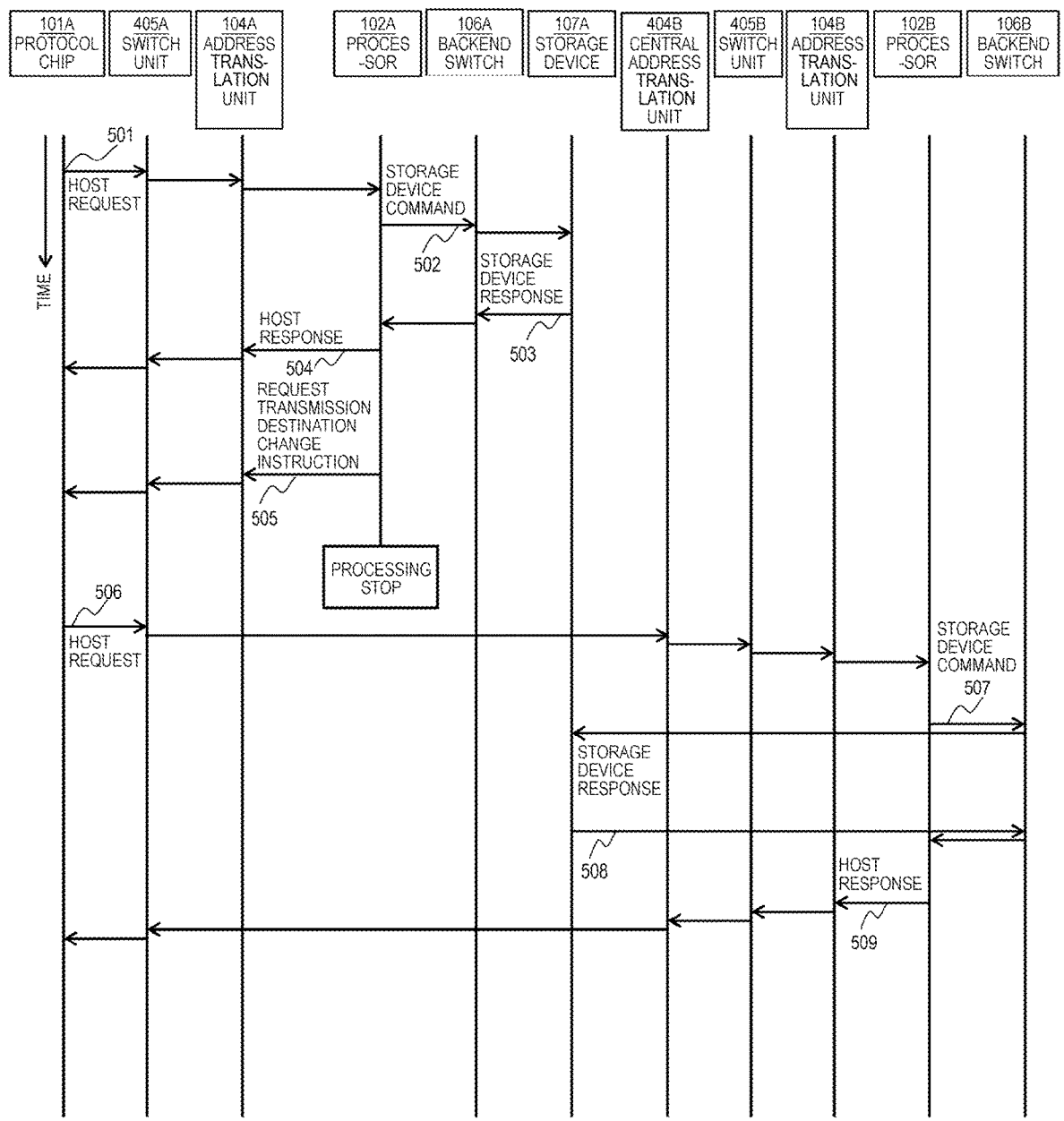
FIG. 5 is a third example of a processing sequence taking over requests and responses from a host apparatus in the second configuration example.

In FIG. 5, when receiving the request from the host apparatus (not illustrated), the protocol chip 101A transmits the host request to the processor 102A through the switch unit 405A and the address translation unit 104A (501). The address translation unit 104A translates the address assigned to the host request for transmitting to the processor 102A by the protocol chip 101A into the address used by the processor 102A.

When receiving the host request, the processor 102A generates the storage device command and transmits the storage device command to the storage device 107A through the backend switch 106A (502). When receiving the storage device command, the storage device 107A performs a predetermined operation according to the storage device command and returns the result as the storage device response to the processor 102A through the backend switch 106A (503).

The processor 102A that receives the storage device response generates the host response according to its content and transmits the host response to the protocol chip 101A through the address translation unit 104A and the switch unit 405A (504). The address translation unit 104A translates the address assigned to the host response for transmitting to the protocol chip 101A by the processor 102A into the address used by the protocol chip 101A.

When receiving the host response, the protocol chip 101A returns the response to the host apparatus (not illustrated). The operations of transmitting the host request and the like from step 501 to step 504 are the same as the operations from step 201 to step 204 illustrated in FIG. 2.

Next, in the third embodiment, an example where the processor 102A transmits a change of the command transmission destination to the protocol chip 101A when the processor 102A stops will be described.

Subsequently, in FIG. 5, the processor 102A generates the request transmission destination change instruction and transmits the request transmission destination change instruction to the protocol chip 101A through the address translation unit 104A and the switch unit 405A (505). The operation of step 505 is the same as the operation of step 205 illustrated in FIG. 2.

After that, the processor 102A stops the processing. An example of the reason for stopping the process is, for example, OS update, as similar as in FIG. 2. In such a case, since it is known in advance that the processor 102A stops, the processor 102A can transmit the request transmission destination change instruction to the protocol chip 101A as in step 505 before stopping the processing.

In the example illustrated in FIG. 5, after the protocol chip 101A receives the request transmission destination change instruction, in the case of receiving the request from the host apparatus (not illustrated), the protocol chip 101A transmits the host request to the processor 102B through the switch unit 405A, the central address translation unit 404B, the switch unit 405B, and the address translation unit 104B (506). The central address translation unit 404B translates the addresses assigned for transmitting to the processor 102B by the protocol chip 101A into the addresses used by the protocol chips 101C and 101D. The address translation unit 104B further translates the addresses for transmitting to the processor 102B, which are translated into the addresses used by the protocol chips 101C and 101D, into the addresses used by the processor 102B.

When receiving the host request, the processor 102B generates the storage device command and transmits the storage device command to the storage device 107A through the backend switch 106B (507). When receiving the storage device command, the storage device 107A performs a predetermined operation according to the storage device command and returns the result as the storage device response to the processor 102B through the backend switch 106B (508).

The processor 102B receiving the storage device response generates the host response according to its content and transmits the host response to the protocol chip 101A through the address translation unit 104B, the switch unit 405B, the central address translation unit 404B, and the switch unit 405A (509). The address translation unit 104B translates the addresses assigned for transmitting to the protocol chip 101A by the processor 102B into the addresses used by the protocol chips 101C and 101D. The central address translation unit 404B further translates the addresses for transmitting to the protocol chip 101A, which are translated into the addresses used by the protocol chips 101C and 101D, into the addresses used by the protocol chips 101A and 101B.

When receiving the host response, the protocol chip 101A returns the response to the host apparatus (not illustrated). The operations of transmitting the host request and the like from step 506 to step 509 are the same as the operations from step 501 to step 504, except for the following points. The processor performing processing is changed from 102A to 102B, the address translation unit is changed from 104A to 104B, and the backend switch is changed from 106A to 106B. In addition, a passage of the two switch units 405A and 405B and the central address translation unit 404B is newly added to transfer of requests and responses between the protocol chip 101A and the processor 102B.

By operating as described above, even when the processor 102A stops the processing, the storage system 2 can continue to receive the host requests and return the responses.

In addition, when the processor 102A resumes the processing, similarly to the operation of step 505, the processor 102A may change back the request transmission destination to the processor 102A from the processor 102B by transmitting the request transmission destination change instruction for changing the request transmission destination to the processor 102A to the protocol chip 101A.

Alternatively, the processor 102B taking over the processing may detect that the processor 102A resumes the processing by some means specified for the purpose. Similarly to the operation of step 505, the processor 102B may transmit the request transmission destination change instruction for changing the request transmission destination to the processor 102A, to the protocol chip 101A and change back the request transmission destination to the processor 102A. AS a result, even when the processor 102A resumes the processing, the request from the host apparatus can be processed without delay.

Fourth Embodiment

Next, a fourth embodiment will be described with reference to FIG. 6. In the fourth embodiment, an example of a configuration of a storage system is the same as the configuration of the storage system 2 illustrated in FIG. 4 described in the third embodiment. Although the configuration of the storage system 2 illustrated in FIG. 4 is used, the operations are different from those of the third embodiment illustrated in FIG. 5, so the differences will be mainly described below.

Figure 6:
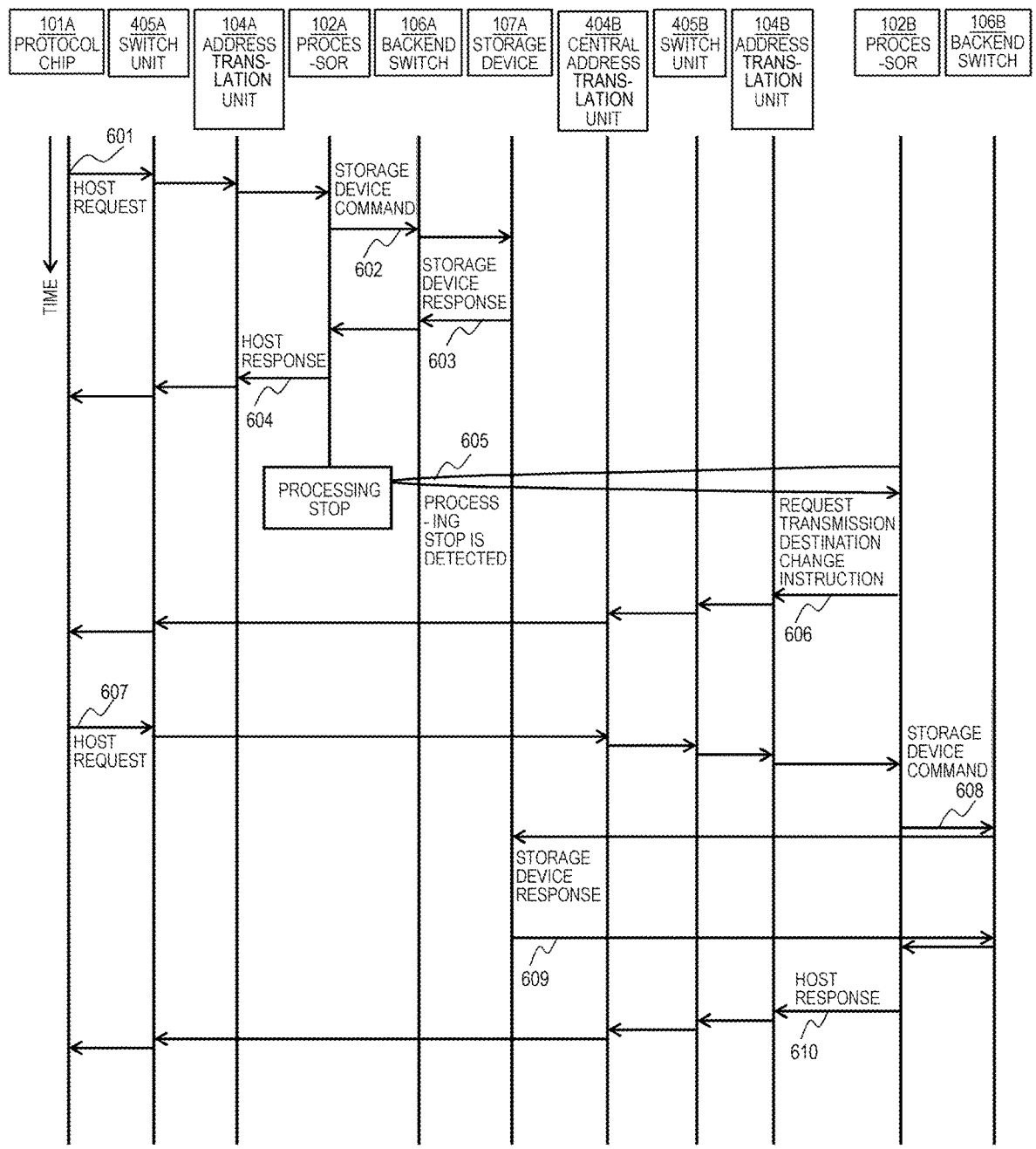
FIG. 6 is a fourth example of a processing sequence taking over the requests and responses from the host apparatus in the second configuration example.

FIG. 6 is an example of an operation of the storage system 2 according to the fourth embodiment. In FIG. 6, when receiving the request from the host apparatus (not illustrated), the protocol chip 101A transmits the host request to the processor 102A through the switch unit 405A and the address translation unit 104A (601). The address translation unit 104A translates the address assigned to the host request for transmitting to the processor 102A by the protocol chip 101A into the address used by the processor 102A.

When receiving the host request, the processor 102A generates the storage device command and transmits the storage device command to the storage device 107A through the backend switch 106A (602). When receiving the storage device command, the storage device 107A performs a predetermined operation according to the storage device command and returns the result as the storage device response to the processor 102A through the backend switch 106A (603).

The processor 102A that receives the storage device response generates the host response according to its content and transmits the host response to the protocol chip 101A through the address translation unit 104A and the switch unit 405A (604). The address translation unit 104A translates the address assigned to the host response for transmitting to the protocol chip 101A by the processor 102A into the address used by the protocol chip 101A. When receiving the host response, the protocol chip 101A returns the response to the host apparatus (not illustrated). The operations of transmitting the host request and the like from step 601 to step 604 are the same as the operations from step 501 to step 504 illustrated in FIG. 5.

Next, in FIG. 6, it is assumed that the processor 102A stops the processing. In this case, the processing may be stopped not only due to factors that can be known and planned in advance, such as OS update, but also due to factors that cannot be known in advance, such as a failure. When it is not known to stop the processing in advance, the processor 102A cannot transmit the request transmission destination change instruction to the protocol chip 101A before stopping the processing, as previously described in step 505 of FIG. 5.

In the example of FIG. 6, although the processor 102A itself cannot know in advance that the processor 102A stops the processing, the processor 102B can detect that the processor 102A stops. Therefore, when the processor 102A stops the processing, the processor 102B detects that the processor 102A stops the processing (605).

When detecting that the processor 102A stops the processing, the processor 102B transmits the request transmission destination change instruction to the protocol chip 101A, which transmits the host request to the processor 102A, through the address translation unit 104B, the switch unit 405B, the central address translation unit 404B, and the switch unit 405A (606). The address translation unit 104B translates the addresses assigned to the request transmission destination change instruction for transmitting to the protocol chip 101A by the processor 102B into the addresses used by the protocol chips 101C and 101D. Furthermore, the central address translation unit 404B translates the addresses for transmitting to the protocol chip 101A, which are translated into the addresses used by the protocol chips 101C and 101D, into the addresses used by the protocol chips 101A and 101B.

After the protocol chip 101A receives the request transmission destination change instruction, in the case of receiving the request from the host apparatus (not illustrated), the protocol chip 101A transmits the host request to the processor 102B through the switch unit 405A, the central address translation unit 404B, the switch unit 405B, and the address translation unit 104B (607). The central address translation unit 404B translates the addresses assigned to the host request for transmitting to the processor 102B into the addresses used by the protocol chips 101C and 101D. The address translation unit 104B further translates the addresses for transmitting to the processor 102B, which are translated into the addresses used by the protocol chips 101C and 101D, into the addresses used by the processor 102B.

When receiving the host request, the processor 102B generates the storage device command and transmits the storage device command to the storage device 107A through the backend switch 106B (608).

When receiving the storage device command, the storage device 107A performs a predetermined according to the storage device command operation and returns the result as the storage device response to the processor 102B through the backend switch 106B (609). The processor 102B that receives the storage device response generates the host response according to its content, and transmits the host response to the protocol chip 101A through the address translation unit 104B, the switch unit 405B, the central address translation unit 404B, and the switch unit 405A (610).

The address translation unit 104B translates the address assigned to the host response for transmitting to the protocol chip 101A by the processor 102B into the addresses used by the protocol chips 101C and 101D. The central address translation unit 404B further translates the addresses for transmitting to the protocol chip 101A, which are translated into the addresses used by the protocol chips 101C and 101D, into the addresses used by the protocol chips 101A and 101B. When receiving the host response, the protocol chip 101A returns the response to the host apparatus (not illustrated). The operations of transmitting the host request and the like from step 607 to step 610 are the same as the operations from step 506 to step 509 illustrated in FIG. 5.

By operating as described above, even when it is not known in advance that the processor 102A stops the processing, the processor 102B detects that the processor 102A stops the processing, and takes over and processes the host request, so the storage system 2 can continue to receive the host requests and return the responses.

When the processor 102A resumes the processing, similarly to the operation of step 606, the processor 102A may change back the request transmission destination to the processor 102A from the processor 102B by transmitting the request transmission destination change instruction for changing the request transmission destination to the processor 102A to the protocol chip 101A.

Alternatively, the processor 102B taking over the processing may detect that the processor 102A resumes the processing by some means specified for the purpose. Similarly to the operation of step 606, the processor 102B may transmit the request transmission destination change instruction for changing the request transmission destination to the processor 102A, to the protocol chip 101A and change back the request transmission destination to the processor 102A. As a result, even when the processor 102A resumes the processing, the requests from the host apparatus can be processed without delay.

Fifth Embodiment

Figure 7:
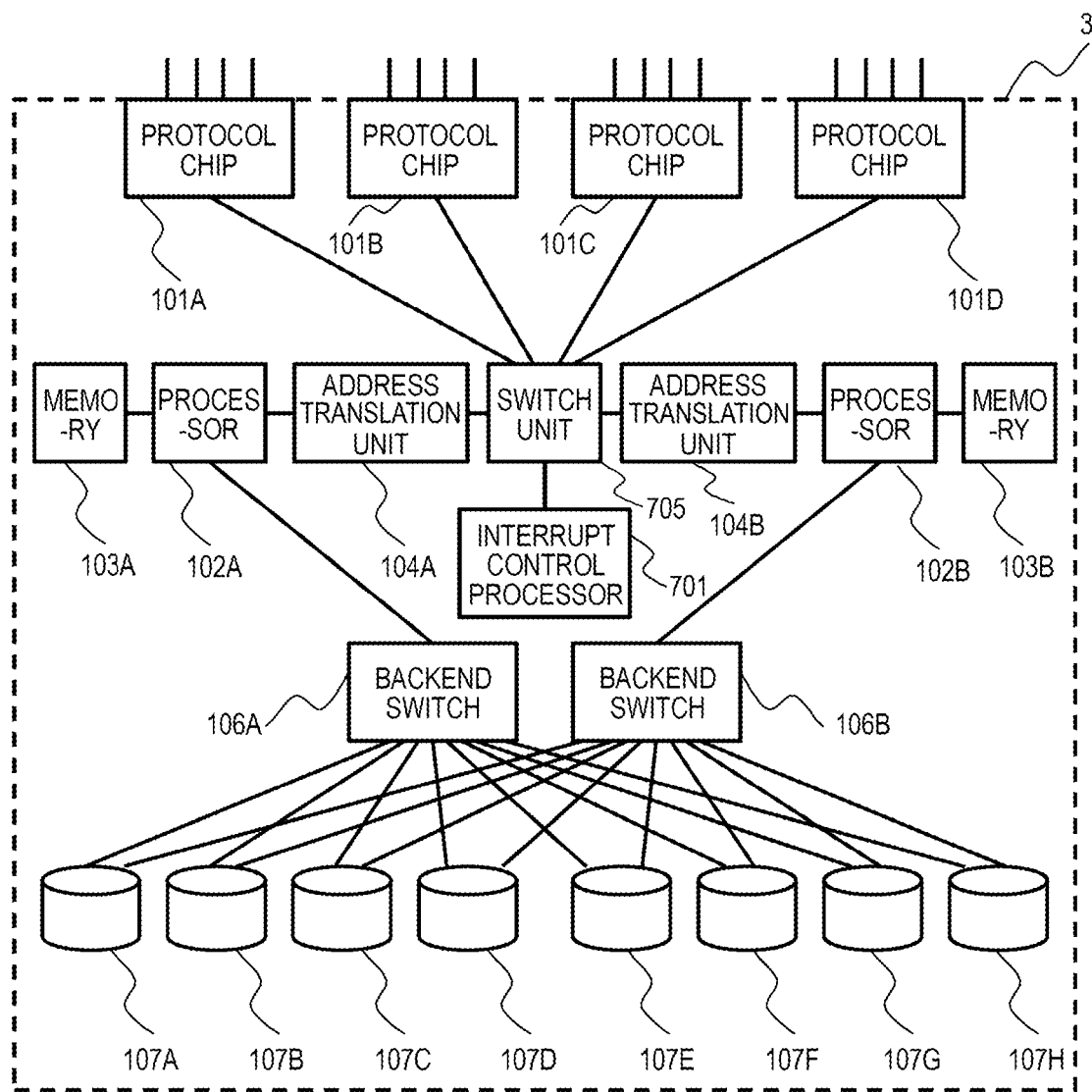
FIG. 7 is a third example of a configuration of the storage system.

A fifth embodiment will be described with reference to FIGS. 7 and 8. FIG. 7 is an example of a configuration of a storage system 3 according to the fifth embodiment. The configuration of the storage system 3 illustrated in FIG. 7 further includes an interrupt control processor 701 compared to the example of the configuration of the storage system 1 according to the first embodiment illustrated in FIG. 1. In addition, the switch unit 705 performs switching between the interrupt control processor 701, the protocol chips 101A to 101D, and the address translation units 104A and 104B.

Although one interrupt control processor 701 is illustrated in FIG. 7, the number of interrupt control processors is not limited to one and may be any number. In particular, the interrupt control processor 701 may be included in the switch unit 705. Other configurations of the storage system 3 are the same as those of the storage system 1 illustrated in FIG. 1.

The interrupt control processor 701 has a function of transmitting an interrupt signal to the processor 102A or 102B when the protocol chips 101A to 101D transmit the interrupt signal. Furthermore, the interrupt control processor 701 has a function of managing and controlling the addresses used by the protocol chips 101A to 101D connected through the switch unit 705, for example, a function of determining and assigning the addresses used by the respective protocol chips 101A to 101D. In addition, the address used by the interrupt control processor 701 may be common to the protocol chips 101A to 101D. All the interrupt signal transmission function and the address management/control function may be implemented by hardware of the interrupt control processor 701 or may be implemented by the interrupt control processor 701 executing a predetermined program.

In addition, as described in the first embodiment, when stopping the processing, the processor 102A transmits an interrupt transmission destination change instruction for changing an interrupt signal transmission destination from the processor 102A to the processor 102B, to the interrupt control processor 701. An example of this operation will be described with reference to FIG. 8.

Figure 8:
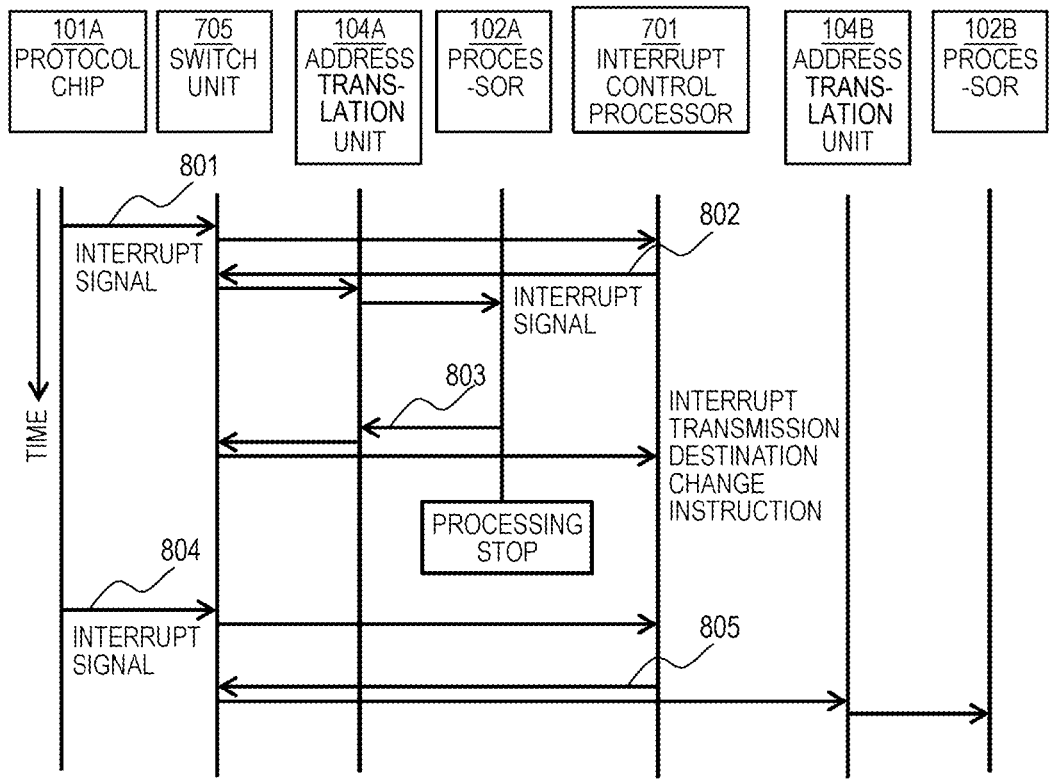
FIG. 8 is a fifth example of a processing sequence for changing a transmission destination of an interrupt signal in the third configuration example.

In FIG. 8, the protocol chip 101A transmits the interrupt signal to the interrupt control processor 701 through the switch unit 705 (801). The interrupt control processor 701 that receives the interrupt signal from the protocol chip 101A copies the interrupt signal and transmits the interrupt signal to the processor 102A through the switch unit 705 and the address translation unit 104A (802). At this time, the interrupt control processor 701, in addition to copying the interrupt signal, may process the interrupt signal or add another signal so that the processor 102A can easily perform the processing.

It is noted that, herein, the interrupt signal may be transmitted by assigning the address used for transmitting to the interrupt control processor 701 through the switch unit 705 by the protocol chip 101A, to specific communication data indicating the interrupt signal. Alternatively, particularly, by providing a dedicated signal line (not illustrated), the interrupt signal may be directly transmitted from the protocol chip 101A to the interrupt control processor 701.

Similarly, the interrupt control processor 701 may transmit the interrupt signal by assigning the address used for transmitting to the processor 102A, to specific communication data indicating the interrupt signal. In this case, the address translation unit 104A translates the address assigned for transmitting to the processor 102A by the interrupt control processor 701 into the address used by the processor 102A. Alternatively, particularly, a dedicated signal line (not illustrated) may be provided to directly transmit the interrupt signal from the interrupt control processor 701 to the processor 102A.

Before stopping the processing, the processor 102A transmits the interrupt transmission destination change instruction to the interrupt control processor 701 through the address translation unit 104A and the switch unit 705 (803). The address translation unit 104A translates the address assigned to the interrupt transmission destination change instruction for transmitting to the interrupt control processor 701 by the processor 102A into the address used by the interrupt control processor 701.

And then, the processor 102A that transmits the interrupt transmission destination change instruction to the interrupt control processor 701 stops the processing. The reason for stopping the processing is, for example, OS update, as in FIG. 2. In such a case, since it is known in advance that the processor 102A stops, the processor 102A can transmit the interrupt transmission destination change instruction to the interrupt control processor 701 as in step 803 before stopping the processing.

In FIG. 8, after the interrupt control processor 701 receives the interrupt transmission destination change instruction, in the case of receiving the interrupt signal from the protocol chip 101A through the switch unit 705 (804), the interrupt control processor 701 copies the interrupt signal similarly to step 802 and transmits the interrupt signal to the processor 102B through the switch unit 705 and the address translation unit 104B (805).

At this time, similarly to step 802, the interrupt control processor 701, in addition to copying the interrupt signal, may process the interrupt signal or add another signal so that the processor 102B can easily perform the processing.

In addition, similarly, the interrupt control processor 701 may transmit the interrupt signal by assigning the address used for transmitting to the processor 102B, to specific communication data indicating the interrupt signal. In this case, the address translation unit 104B translates the address assigned by the interrupt control processor 701 into the address used by the processor 102B. Alternatively, particularly, a dedicated signal line (not illustrated) may be provided to directly transmit the interrupt signal from the interrupt control processor 701 to the processor 102B.

As a result, when the protocol chip 101A transmits the interrupt signal, even after the processor 102A stops the processing, the protocol chip 101A can transmit the interrupt signal to the processor 102B, and thus, continuously, the interrupt signal of the protocol chip 101A can be received by the processor 102B, and then, the corresponding interrupt processing can be performed.

In addition, when the processor 102A resumes the processing, similarly to the operation of step 803, the processor 102A may change back the interrupt transmission destination to the processor 102A by transmitting the interrupt transmission destination change instruction for changing the interrupt transmission destination to the processor 102A to the interrupt control processor 701. Alternatively, the processor 102B taking over the processing may detect that the processor 102A resumes the processing by some means specified for the purpose. Similarly to the operation of step 803, the processor 102B may transmit the interrupt transmission destination change instruction for changing the interrupt transmission destination to the processor 102A, to the interrupt control processor 701 and change back the interrupt transmission destination to the processor 102A. As a result, even when the processor 102A resumes the processing, the interrupt signal from the protocol chip 101A can be processed without delay.

Sixth Embodiment

Next, a sixth embodiment will be described with reference to FIG. 9. In the sixth embodiment, an example of a configuration of a storage system is the same as the configuration of the storage system 3 illustrated in FIG. 7 described in the fifth embodiment. Although the configuration of the storage system 3 illustrated in FIG. 7 is used, the operations are different from those of the fifth embodiment illustrated in FIG. 8, so the differences will be mainly described below.

Figure 9:
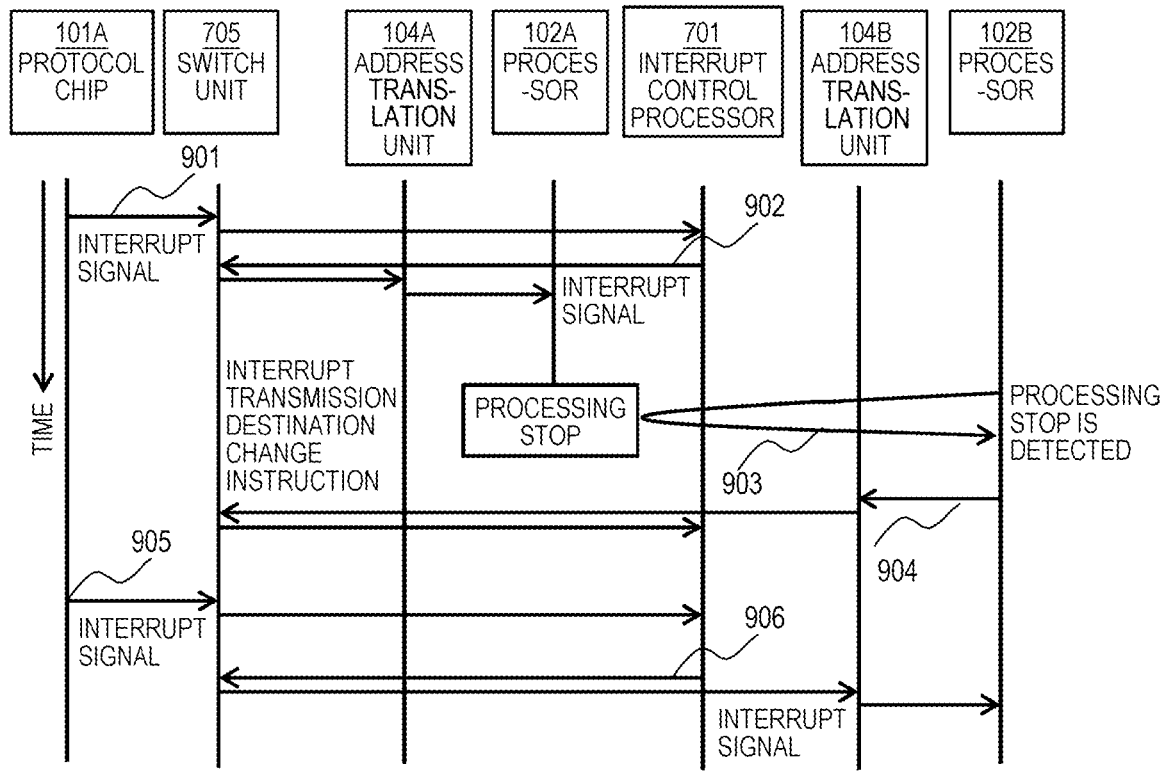
FIG. 9 is a sixth example of a processing sequence for changing the transmission destination of the interrupt signal in the third configuration example.

FIG. 9 is an example of an operation of the storage system 3 according to the sixth embodiment. In FIG. 9, the protocol chip 101A transmits the interrupt signal to the interrupt control processor 701 through the switch unit 705 (901).

The interrupt control processor 701 that receives the interrupt signal from the protocol chip 101A copies the interrupt signal and transmits the interrupt signal to the processor 102A through the switch unit 705 and the address translation unit 104A (902). At this time, the interrupt control processor 701, in addition to copying the interrupt signal, may process the interrupt signal or add another signal so that the processor 102A can easily perform the processing.

Further, the interrupt control processor 701 may transmit the interrupt signal by assigning the address used for transmitting to the processor 102A, to specific communication data indicating the interrupt signal. In this case, the address translation unit 104A translates the address assigned for transmitting to the processor 102A by the interrupt control processor 701 into the address used by the processor 102A. Alternatively, particularly, a dedicated signal line (not illustrated) may be provided to directly transmit the interrupt signal from the interrupt control processor 701 to the processor 102A. The operations from step 901 to step 902 are the same as the operations from step 801 to step 802 illustrated in FIG. 8.

Next, in FIG. 9, it is assumed that the processor 102A stops the processing. In this case, as in the second embodiment, the processing may be stopped not only due to factors that can be known and planned in advance, such as OS update, but also due to factors that cannot be known in advance, such as a failure. When it is not known to stop the processing in advance, the processor 102A cannot transmit the interrupt transmission destination change instruction to the interrupt control processor 701 before stopping the processing, as previously described in step 803 of FIG. 8.

In the example of FIG. 9, although the processor 102A itself cannot know in advance that the processor 102A stops the processing, the processor 102B can detect that the processor 102A stops. Therefore, when the processor 102A stops the processing, the processor 102B detects that the processor 102A stops the processing (903).

When detecting that the processor 102A stops the processing, the processor 102B transmits the interrupt transmission destination change instruction to the interrupt control processor 701, which transmits the interrupt signal to the processor 102A, through the address translation unit 104B and the switch unit 705 (904). The address translation unit 104B translates the address assigned by the processor 102B for transmitting the interrupt transmission destination change instruction to the interrupt control processor 701 into the address used by the interrupt control processor 701.

In FIG. 9, after the interrupt control processor 701 receives the interrupt transmission destination change instruction, in the case of receiving the interrupt signal from the protocol chip 101A through the switch unit 705 (905), the interrupt control processor 701 copies the interrupt signal similarly to step 902 and transmits the interrupt signal to the processor 102B through the switch unit 705 and the address translation unit 104B (906).

At this time, similarly to step 902, the interrupt control processor 701, in addition to copying the interrupt signal, may process the interrupt signal or add another signal so that the processor 102B can easily perform the processing. In addition, the interrupt control processor 701 may transmit the interrupt signal by assigning the address used for transmitting to the processor 102B by the interrupt control processor 701, to specific communication data indicating the interrupt signal. In this case, the address translation unit 104B translates the address assigned for transmitting to the processor 102B by the interrupt control processor 701 into the address used by the processor 102B. Alternatively, particularly, a dedicated signal line (not illustrated) may be provided to directly transmit the interrupt signal from the interrupt control processor 701 to the processor 102B.

As a result, even when it is not known in advance that the processor 102A stops the processing, the processor 102B can detect that the processor 102A stops the processing and can change the transmission destination of the interrupt signal to the processor 102B. Accordingly, continuously, the interrupt signal of the protocol chip 101A can be received by the processor 102B, and then, the corresponding interrupt processing can be performed.

When the processor 102A resumes the processing, similarly to the operation of step 904, the processor 102A may change back the interrupt transmission destination to the processor 102A by transmitting the interrupt transmission destination change instruction for changing the interrupt transmission destination to the processor 102A to the interrupt control processor 701.

Alternatively, the processor 102B taking over the processing may detect that the processor 102A resumes the processing by some means specified for the purpose. Similarly to the operation of step 904, the processor 102B may transmit the interrupt transmission destination change instruction for changing the interrupt transmission destination to the processor 102A, to the interrupt control processor 701 and change back the interrupt transmission destination to the processor 102A. As a result, even when the processor 102A resumes the processing, the interrupt signal from the protocol chip 101A can be processed without delay.

Seventh Embodiment

Figure 10:
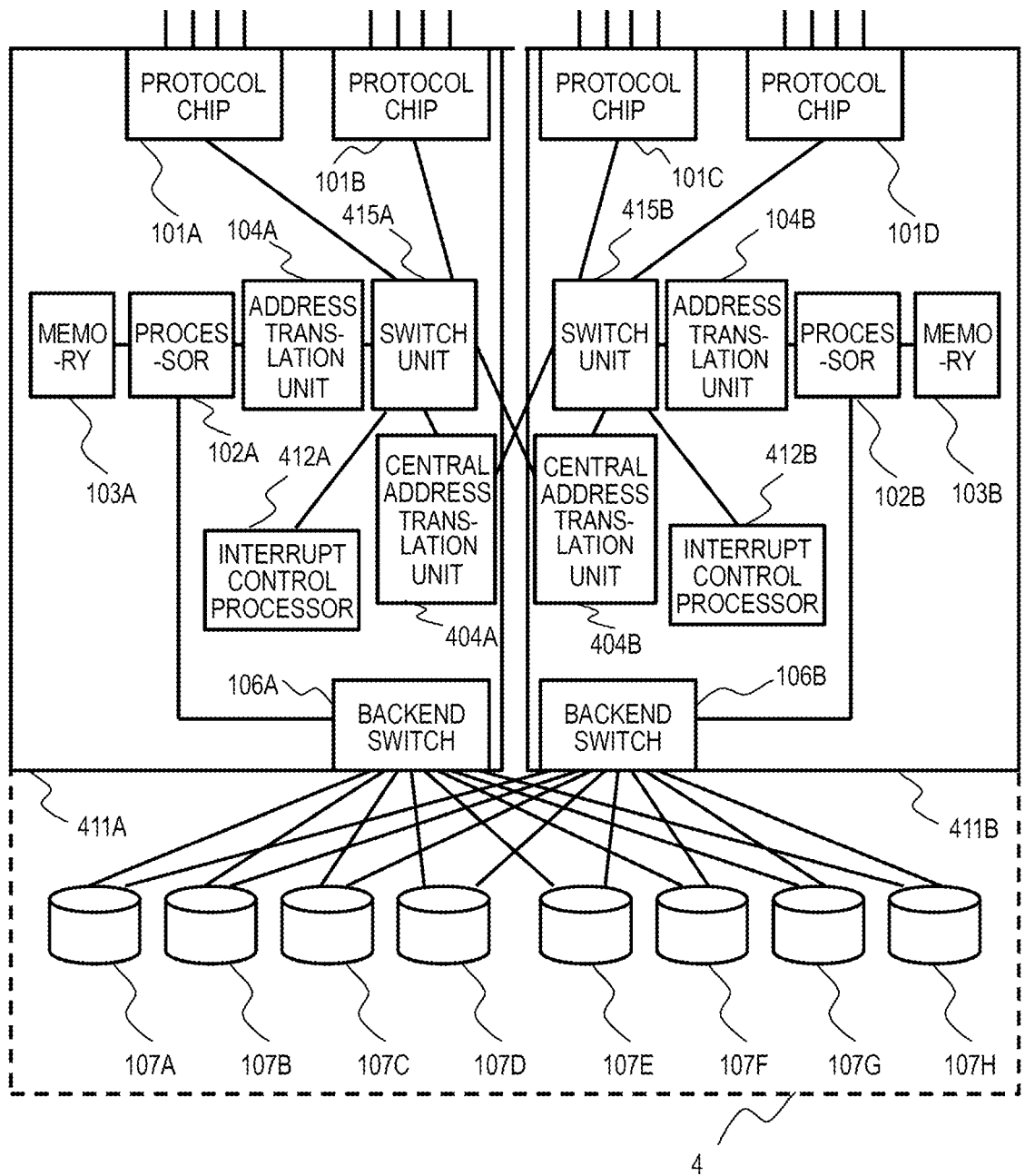
FIG. 10 is a fourth example of a configuration of the storage system.

A seventh embodiment will be described with reference to FIGS. 10 and 11. FIG. 10 is an example of a configuration of a storage system 4 according to the seventh embodiment. The configuration of the storage system 4 illustrated in FIG. 10 further includes an interrupt control processor 412A in a storage controller 411A and an interrupt control processor 412B in a storage controller 411B, compared to the example of the configuration of the storage system 2 according to the third embodiment illustrated in FIG. 4.

In addition, a switch unit 415A performs switching among the interrupt control processor 412A, the protocol chips 101A and 101B, the address translation unit 104A, and the central address translation units 404A and 404B. Similarly, a switch unit 415B performs switching among the interrupt control processor 412B, the protocol chips 101C and 101D, the address translation unit 104B, and the central address translation units 404A and 404B.

Although FIG. 10 illustrates only one of the interrupt control processors 412A and 412B for each of the storage controllers 411A and 411B, the number of interrupt control processors is any number. In particular, the switch unit 415A or 415B may include a function equivalent to that of the interrupt control processor 412A or 412B. Other configurations of the storage system 4 are the same as those of the storage system 2 illustrated in FIG. 4.

The interrupt control processor 412A has a function of transmitting the interrupt signal to the processor 102A or 102B when the protocol chips 101A and 101B transmit the interrupt signal. Furthermore, the interrupt control processor 412A may have a function of managing and controlling the addresses used by the protocol chips 101A and 101B connected through the switch unit 415A, for example, a function of determining and assigning the addresses used by the respective protocol chips 101A and 101B.

In addition, the address used by the interrupt control processor 412A may be common to the address used by the protocol chips 101A and 101B. All the interrupt signal transmission function and the address management/control function may be implemented by the hardware of the interrupt control processor 412A or may be implemented by the interrupt control processor 412A executing a predetermined program.

The interrupt control processor 412B has a function of transmitting the interrupt signal to the processor 102A or 102B when the protocol chips 101C and 101D transmit the interrupt signal. Furthermore, the interrupt control processor 412B has a function of managing and controlling the addresses used by the protocol chips 101C and 101D connected through the switch unit 415B, for example, a function of determining and assigning the addresses used by the respective protocol chips 101C and 101D. In addition, the address used by the interrupt control processor 412B may be the same as the address used by the protocol chips 101C and 101D. All the interrupt signal transmission function and the address management/control function may be implemented by hardware of the interrupt control processor 412B or may be implemented by the interrupt control processor 412B executing a predetermined program.

In addition, as described in the third embodiment, when stopping the processing, the processor 102A transmits the interrupt transmission destination change instruction for changing the interrupt signal transmission destination from the processor 102A to the processor 102B, to the interrupt control processor 412B. An example of this operation will be described with reference to FIG. 11.

Figure 11:
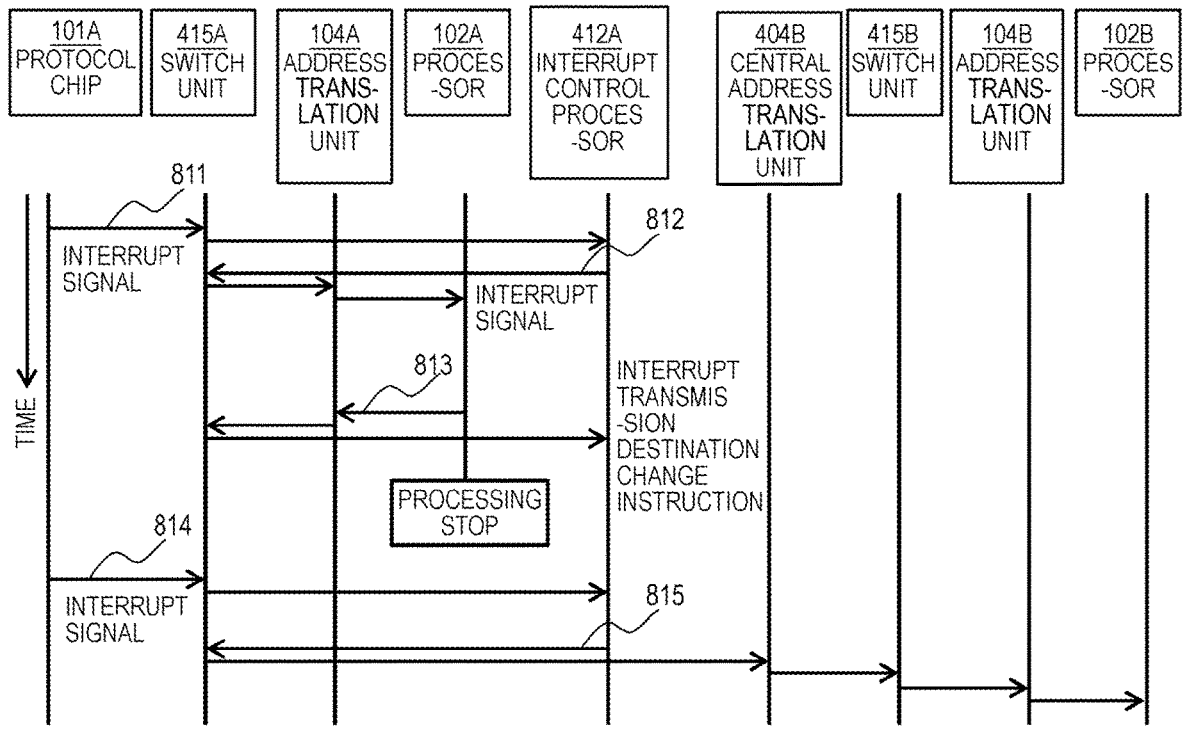
FIG. 11 is a seventh example of a processing sequence for changing a transmission destination of an interrupt signal in the fourth configuration example.

In FIG. 11, the protocol chip 101A transmits the interrupt signal to the interrupt control processor 412A through the switch unit 415A (811). The interrupt control processor 412A that receives the interrupt signal from the protocol chip 101A copies the interrupt signal and transmits the interrupt signal to the processor 102A through the switch unit 415A and the address translation unit 104A (812). At this time, the interrupt control processor 412A, in addition to copying the interrupt signal, may process the interrupt signal or add another signal so that the processor 102A can easily perform the processing.

Herein, the interrupt signal may be transmitted by assigning the address used for transmitting to the interrupt control processor 412A through the switch unit 415A by the protocol chip 101A, to specific communication data indicating the interrupt signal. Alternatively, particularly, a dedicated signal line (not illustrated) may be provided to directly transmit the interrupt signal from the protocol chip 101A to the interrupt control processor 412A.

Similarly, the interrupt control processor 412A may transmit the interrupt signal by assigning the address used for transmitting to the processor 102A, to specific communication data indicating the interrupt signal. In this case, the address translation unit 104A translates the address assigned by the interrupt control processor 412A into the address used by the processor 102A. Alternatively, particularly, a dedicated signal line (not illustrated) may be provided to directly transmit the interrupt signal from the interrupt control processor 412A to the processor 102A.

Before stopping the processing, the processor 102A transmits the interrupt transmission destination change instruction to the interrupt control processor 412A through the address translation unit 104 and the switch unit 415A (813). The address assigned to the interrupt transmission destination change instruction for transmitting to the interrupt control processor 412A by the processor 102A is translated into the address used by the interrupt control processor 412A.

And then, the processor 102A that transmits the interrupt transmission destination change instruction to the interrupt control processor 412A stops the processing. The reason for stopping the processing is, for example, OS update, as in FIG. 8. In such a case, since it is known in advance that the processor 102A stops, the processor 102A can transmit the interrupt transmission destination change instruction to the interrupt control processor 412A as in step 813 before stopping the processing.

In FIG. 11, after the interrupt control processor 412A receives the interrupt transmission destination change instruction, in the case of receiving the interrupt signal from the protocol chip 101A through the switch unit 415A (814), the interrupt control processor 412A copies the interrupt signal similarly to step 812 and transmits the interrupt signal to the processor 102B through the switch unit 415A, the central address translation unit 404B, the switch unit 415B, and the address translation unit 104B (815). At this time, similarly to step 812, the interrupt control processor 412A, in addition to copying the interrupt signal, may process the interrupt signal or add another signal so that the processor 102B can easily perform the processing.

Similarly, the interrupt control processor 412A may transmit the interrupt signal by assigning the address used for transmitting to the processor 102B, to specific communication data indicating the interrupt signal. In this case, the central address translation unit 404B translates the addresses assigned by the interrupt control processor 412A into the addresses used by the protocol chips 101C and 101D. And then, the address translation unit 104B translates the addresses for transmitting to the processor 102B, which are translated into the addresses used by the protocol chips 101C and 101D, into the addresses used by the processor 102B. Alternatively, particularly, a dedicated signal line (not illustrated) may be provided to directly transmit the interrupt signal from the interrupt control processor 412A to the processor 102B.

As a result, when the protocol chip 101A transmits the interrupt signal, even after the processor 102A stops the processing, the protocol chip 101A can transmit the interrupt signal to the processor 102B, and thus, continuously, the interrupt signal of the protocol chip 101A can be received by the processor 102B, and then, the corresponding interrupt processing can be performed.

In addition, when the processor 102A resumes the processing, similarly to the operation of step 813, the processor 102A may change back the interrupt transmission destination to the processor 102A by transmitting the interrupt transmission destination change instruction for changing the interrupt transmission destination to the processor 102A.

Alternatively, the processor 102B taking over the processing may detect that the processor 102A resumes the processing by some means specified for the purpose. Similarly to the operation of step 813, the processor 102B may transmit the interrupt transmission destination change instruction for changing the interrupt transmission destination to the processor 102A, to the interrupt control processor 412A and change back the interrupt transmission destination to the processor 102A. As a result, even when the processor 102A resumes the processing, the interrupt signal from the protocol chip 101A can be processed without delay.

Eighth Embodiment

Next, an eighth embodiment will be described with reference to FIG. 12. In the eighth embodiment, an example of a configuration of a storage system is the same as the configuration of the storage system 4 illustrated in FIG. 10 described in the seventh embodiment. Although the configuration of the storage system 4 illustrated in FIG. 10 is used, the operations are different from those of the seventh embodiment illustrated in FIG. 11, so the differences will be mainly described below.

Figure 12:
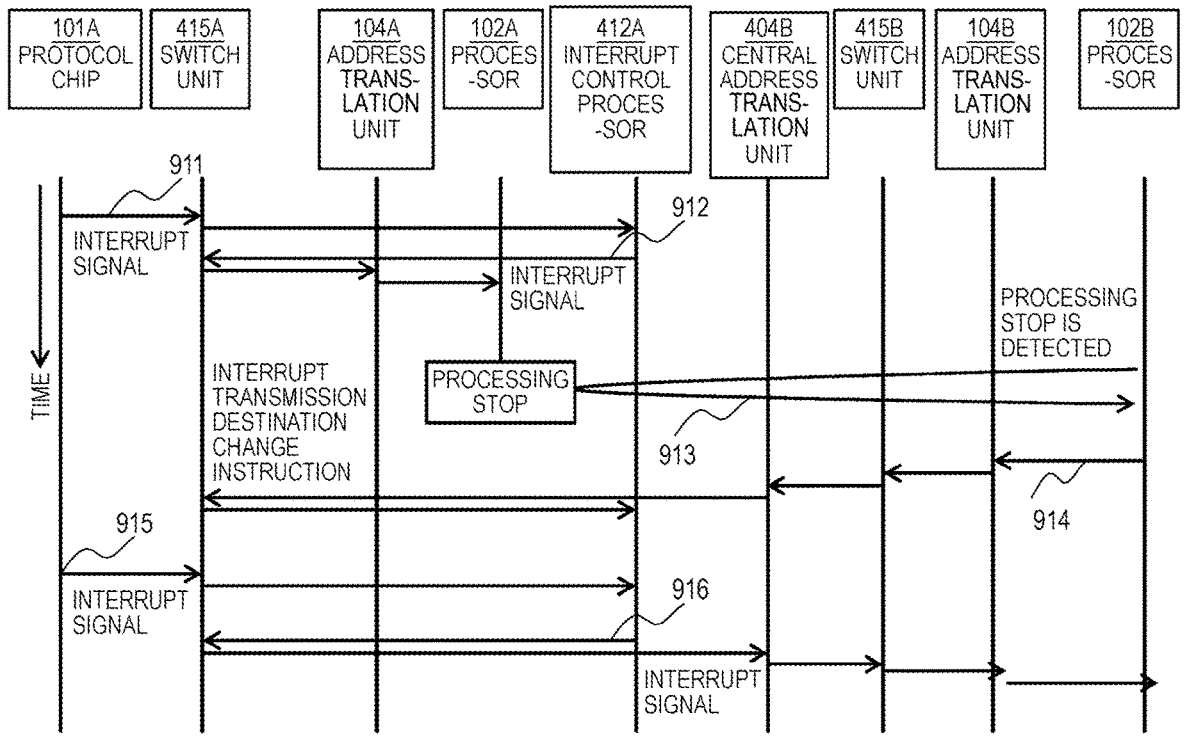
FIG. 12 is an eighth example of a processing sequence for changing the transmission destination of the interrupt signal in the fourth configuration example.

FIG. 12 is an example of an operation of the storage system 4 according to the eighth embodiment. In FIG. 12, the protocol chip 101A transmits the interrupt signal to the interrupt control processor 412A through the switch unit 415A (911). The interrupt control processor 412A that receives the interrupt signal from the protocol chip 101A copies the interrupt signal and transmits the interrupt signal to the processor 102A through the switch unit 415A and the address translation unit 104A (912).

At this time, the interrupt control processor 412A, in addition to copying the interrupt signal, may process the interrupt signal or add another signal so that the processor 102A can easily perform the processing. In addition, the interrupt control processor 412A may transmit the interrupt signal by assigning the address used for transmitting to the processor 102A, to specific communication data indicating the interrupt signal.

In this case, the address translation unit 104A translates the address assigned for transmitting to the processor 102A by the interrupt control processor 412A into the address used by the processor 102A. Alternatively, a dedicated signal line (not illustrated) may be provided to directly transmit the interrupt signal from the interrupt control processor 412A to the processor 102A. The operations from step 911 to step 912 are the same as the operations from step 811 to step 812 illustrated in FIG. 11.

Next, in FIG. 12, it is assumed that processor 102A stops the processing. In this case, as in the sixth embodiment, the processing may be stopped not only due to factors that can be known and planned in advance, such as OS update, but also due to factors that cannot be known in advance, such as a failure. When it is not known to stop the processing in advance, processor 102A cannot transmit the interrupt transmission destination change instruction to the interrupt control processor 412A before stopping the processing, as previously described in step 813 of FIG. 11.

In the example of FIG. 12, although the processor 102A itself cannot know in advance that the processor 102A stops the processing, the processor 102B can detect that the processor 102A stops. Therefore, when the processor 102A stops the processing, the processor 102B detects that the processor 102A stops the processing (913).

When the processor 102B detects that the processor 102A stops the processing, the processor 102B transmits the interrupt transmission destination change instruction to the interrupt control processor 412A, which transmits the interrupt signal to the processor 102A, through the address translation unit 104B, the switch unit 415B, the central address translation unit 404B, and the switch unit 415A (914).

The address translation unit 104B translates the address assigned to the interrupt transmission destination change instruction for transmitting to the interrupt control processor 412A by the processor 102B into the address used by the protocol chips 101C and 101D. And then, the central address translation unit 404B translates the addresses for transmitting to the interrupt control processor 412A, which are translated into the addresses used by the protocol chips 101C and 101D, into the addresses used by the interrupt control processor 412A.

In FIG. 12, after the interrupt control processor 412A receives the interrupt transmission destination change instruction, in the case of receiving the interrupt signal from the protocol chip 101A through the switch unit 415A (915), the interrupt control processor 412A copies the interrupt signal similarly to step 912 and transmits the interrupt signal to the processor 102B through the switch unit 415A, the central address translation unit 404B, the switch unit 415B, and the address translation unit 104B (916).

At this time, similarly to step 912, the interrupt control processor 412A, in addition to copying the interrupt signal, may process the interrupt signal or add another signal so that the processor 102B can easily perform the processing. In addition, the interrupt control processor 412A may transmit the interrupt signal by assigning the address used for transmitting to the processor 102B by the interrupt control processor 412A, to specific communication data indicating the interrupt signal.

In this case, the central address translation unit 404B translates the address assigned for transmitting to the processor 102B by the interrupt control processor 412A into the address used by the protocol chips 101C and 101D. And then, the address translation unit 104B translates the addresses for transmitting to the processor 102B, which are translated into the addresses used by the protocol chips 101C and 101D, into the addresses used by the processor 102B. Alternatively, particularly, a dedicated signal line (not illustrated) may be provided to directly transmit the interrupt signal from the interrupt control processor 412A to the processor 102B.

As a result, even when it is not known in advance that the processor 102A stops the processing, the processor 102B can detect that the processor 102A stops the processing and can change the transmission destination of the interrupt signal to the processor 102B, and thus, continuously, the interrupt signal of the protocol chip 101A can be received by the processor 102B, and then, the corresponding interrupt processing can be performed.

When the processor 102A resumes the processing, similarly to the operation of step 914, the processor 102A may change back the interrupt transmission destination to the processor 102A by transmitting the interrupt transmission destination change instruction for changing the interrupt transmission destination to the processor 102A to the interrupt control processor 412A.

Alternatively, the processor 102B taking over the processing may detect that the processor 102A resumes the processing by some means specified for the purpose. Similarly to the operation of step 914, processor 102B may transmit the interrupt transmission destination change instruction for changing the interrupt transmission destination to the processor 102A, to the interrupt control processor 412A and change back the interrupt transmission destination to the processor 102A. As a result, even when the processor 102A resumes the processing, the interrupt signal from the protocol chip 101A can be processed without delay.

In addition, the invention is not limited to the above-described embodiments and includes various modifications. For example, the above-described embodiments have been described in detail in order to describe the invention for the better understanding and are not necessarily limited to those having all the described configurations. In addition, a portion of the configuration of one embodiment can be replaced with the configuration of another embodiment, and the configuration of another embodiment can be added to the configuration of one embodiment. In addition, a portion of the configuration of each embodiment can be added, deleted, or replaced with another configuration.

Further, each of the above-described configurations, functions, processing units, and the like may be implemented by hardware, for example, by designing a portion or all of the above-described configurations, functions, processing units, and the like using an integrated circuit. Moreover, each of the above-described configurations, functions, and the like may be implemented by software by a processor interpreting and executing a program for implementing each function. Information on programs, tables, files, and the like implementing each function can be placed in a memory, a recording device such as a hard disk or an SSD, or a recording medium such as an IC card or an SD card. In addition, control lines and information lines are indicated to those considered necessary for description, and thus, not all control lines and information lines are necessarily indicated in terms of products. Actually, it may be considered that almost all configurations are interconnected.

What is claimed is:

1. A storage system processing a request from a host apparatus, comprising:
    a storage controller, wherein the storage controller comprises:
        a protocol chip controlling a protocol for communication with the host apparatus;
        a plurality of processors performing control of the storage system;
        a first address translation unit translating between a first memory address used by a first processor among the plurality of processors and a second memory address used by the protocol chip; and
        a second address translation unit translating between a third memory address used by a second processor among the plurality of processors and the second memory address,
    wherein the protocol chip transmits the request from the host apparatus to the first processor through the first address translation unit,
    wherein the first processor transmits a response to the request from the host apparatus transmitted from the protocol chip, to the protocol chip through the first address translation unit,
    wherein, when the first processor stops processing, an instruction to transmit the request from the host apparatus to the second processor is transmitted to the protocol chip,
    wherein, after receiving the instruction to transmit the request from the host apparatus to the second processor, the protocol chip transmits the request from the host apparatus to the second processor through the second address translation unit,
    wherein the second processor transmits the response to the request from the host apparatus transmitted to the second processor, to the protocol chip through the second address translation unit,
    wherein the second memory address is being used by a third processor,
    wherein the protocol chip transmits an interrupt signal to the third processor,
    wherein, when receiving the interrupt signal from the protocol chip, the third processor transmits the interrupt signal to the first processor,
    wherein, when the first processor stops the processing, the instruction to transmit the interrupt signal to the second processor is transmitted to the third processor, and
    wherein, after receiving the instruction to transmit the interrupt signal to the second processor, when receiving the interrupt signal from the protocol chip, the third processor transmits the interrupt signal to the second processor through the second address translation unit.

2. The storage system according to claim 1, wherein, before the first processor stops the processing, the first processor transmits the instruction to transmit the request from the host apparatus to the second processor, to the protocol chip through the first address translation unit, and then the first processor stops.

3. The storage system according to claim 1, wherein, when the first processor stops the processing, the second processor detects that the processing of the first processor is stopped and transmits the instruction to transmit the request from the host apparatus to the second processor, to the protocol chip through the second address translation unit.

4. The storage system according to claim 1, wherein, before the first processor stops the processing, the first processor transmits the instruction to transmit the interrupt signal to the second processor, to the third processor through the first address translation unit, and then the first processor stops.

5. The storage system according to claim 1, wherein, when the first processor stops the processing, the second processor detects that the processing of the first processor is stopped and transmits the instruction to transmit the interrupt signal to the second processor, to the third processor through the second address translation unit.

6. A storage system processing a request from a host apparatus, comprising a plurality of storage controllers,
    wherein a first storage controller among the plurality of storage controllers includes:
        a first protocol chip controlling a protocol for communication with the host apparatus,
        a first processor performing control of the storage system, and
        a first address translation unit translating between a first memory address used by the first processor and a second memory address used by the first protocol chip,
    wherein a second storage controller among the plurality of storage controllers includes:
        a second protocol chip controlling a protocol for communication with a host apparatus,
        a second processor performing control of the storage system, and
        a second address translation unit translating between a third memory address used by the second processor and a fourth memory address used by the second protocol chip,
    wherein at least one of the first storage controller and the second storage controller includes a third address translation unit translating between the second memory address and the fourth memory address,
    wherein the first protocol chip transmits the request from the host apparatus to the first processor through the first address translation unit,
    wherein the first processor transmits a response to the request from the host apparatus transmitted from the first protocol chip, to the first protocol chip through the first address translation unit,
    wherein, when the first processor stops processing, an instruction to transmit the request from the host apparatus to the second processor is transmitted to the first protocol chip, wherein, after receiving the instruction to transmit the request from the host apparatus to the second processor, the first protocol chip transmits the request from the host apparatus to the second processor through the third address translation unit and the second address translation unit, wherein the second processor transmits the response to the request from the host apparatus transmitted from the first protocol chip to the second processor, to the first protocol chip through the second address translation unit and the third address translation unit, wherein the first storage controller further includes a third processor using the second memory address, wherein the first protocol chip transmits an interrupt signal to the third processor, wherein, when receiving the interrupt signal from the first protocol chip, the third processor transmits the interrupt signal to the first processor, wherein, when the first processor stops the processing, the instruction to transmit the interrupt signal to the second processor is transmitted to the third processor, and wherein, after receiving the instruction to transmit the interrupt signal to the second processor, when receiving the interrupt signal from the first protocol chip, the third processor transmits the interrupt signal to the second processor.

7. The storage system according to claim 6, wherein, before the first processor stops the processing, the first processor transmits the instruction to transmit the request from the host apparatus to the second processor, to the first protocol chip through the first address translation unit, and then the first processor stops.

8. The storage system according to claim 6, wherein, when the first processor stops the processing, the second processor detects that the processing of the first processor is stopped and transmits the instruction to transmit the request from the host apparatus to the second processor, to the first protocol chip through the second address translation unit and the third address translation unit.

9. The storage system according to claim 6, wherein, before the first processor stops the processing, the first processor transmits the instruction to transmit the interrupt signal to the second processor, to the third processor through the first address translation unit, and then the first processor stops.

10. The storage system according to claim 6, wherein, when the first processor stops the processing, the second processor detects that the processing of the first processor is stopped and transmits the instruction to transmit the interrupt signal to the second processor, to the third processor through the second address translation unit and the third address translation unit.

* * * * *